(12) United States Patent
Topliss

(10) Patent No.: US 10,197,775 B2
(45) Date of Patent: Feb. 5, 2019

(54) MINIATURE CAMERA ZOOM ACTUATOR

(71) Applicant: Richard J. Topliss, Campbell, CA (US)

(72) Inventor: Richard J. Topliss, Campbell, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 14/868,309

(22) Filed: Sep. 28, 2015

(65) Prior Publication Data

US 2016/0033739 A1 Feb. 4, 2016

Related U.S. Application Data

(63) Continuation of application No. PCT/US2014/032223, filed on Mar. 28, 2014.

(Continued)

(51) Int. Cl.
*G02B 7/02* (2006.01)
*G02B 13/00* (2006.01)
*G03B 5/00* (2006.01)
*G02B 7/10* (2006.01)
*H04N 5/225* (2006.01)

(Continued)

(52) U.S. Cl.
CPC ........... *G02B 13/009* (2013.01); *G02B 7/026* (2013.01); *G02B 7/102* (2013.01); *G03B 5/00* (2013.01); *H04N 5/2254* (2013.01); *H04N 5/23216* (2013.01); *H04N 5/23296* (2013.01); *G03B 2205/0046* (2013.01); *G03B 2205/0061* (2013.01); *H04M 1/0264* (2013.01)

(58) Field of Classification Search
CPC .......... G02B 7/102; G02B 7/00; G02B 7/003; G02B 7/023; G02B 7/005; G02B 7/04; G02B 13/009; G02B 13/001; G02B 26/0858; G03B 5/00; G03B 29/00; G03B 2205/0046; G03B 2205/0061; H02N 2/025
USPC .................................. 359/676–706, 822–826
See application file for complete search history.

(56) References Cited

U.S. PATENT DOCUMENTS

2010/0290138 A1* 11/2010 Thomas .................. G02B 7/08
359/824

FOREIGN PATENT DOCUMENTS

JP 04 177214 6/1992

OTHER PUBLICATIONS

Notification of Preliminary Report and Written Opinion from PCT/US2014/032223, Bynlac Laboratories, LLC, dated Oct. 8, 2015, pp. 1-8.

* cited by examiner

*Primary Examiner* — Mahidere Sahle
(74) *Attorney, Agent, or Firm* — Robert C. Kowert; Meyertons, Hood, Kivlin, Kowert & Goetzel, P.C.

(57) ABSTRACT

Some embodiments include a fixed chassis structure and a moveable carriage body carrying one or more lenses. The carriage body is movably mounted to the chassis structure so as to limit a plurality of degrees of freedom of movement of the moveable carriage body but to allow movement along an optical axis through the one or more lenses. An inertial actuator is mounted to the moveable carriage body such that the axis of motion of the actuator is parallel to at least one allowed degree of freedom. The moveable carriage body is held in place with respect to the at least one allowed degree of freedom by one or more friction forces received at one or more mechanical contacts with the chassis structure. The inertial actuator is actionable to overcome the friction forces, (Continued)

and an inertial mass is mounted to the inertial actuator on a side opposite the carriage body.

20 Claims, 26 Drawing Sheets

Related U.S. Application Data

(60) Provisional application No. 61/806,250, filed on Mar. 28, 2013.

(51) Int. Cl.
*H04N 5/232* (2006.01)
*H04M 1/02* (2006.01)

MINIATURE CAMERA ZOOM ACTUATOR

This application is a continuation of International Application No. PCT/US2014/032223, filed Mar. 28, 2014, which claims benefit of priority of U.S. Provisional Application Ser. No. 61/806,250, filed Mar. 28, 2013, both of which are incorporated by reference herein in their entirety.

BACKGROUND

Technical Field

This disclosure relates generally to control of the motion of camera components. More specifically, this disclosure relates to an actuator for a zoom lens in a miniature camera.

Description of the Related Art

Miniature cameras are typically used in mobile devices such as cellphones. In such devices, space is a premium and every effort is made to minimize the camera size. A zoom lens is a lens where the lens elements can be moved relative to one another to change the focal length of the lens. In doing so, this changes the field of view of the lens. In addition, such a lens is most typically required to adjust focus for different object distances. Many different configurations of zoom lens are possible. However, for a typical optical zoom lens, there are at least two lens groups that move independently of each other along the optical axis relative to the image sensor, but in a relational manner to each other. There are additionally typically further lens groups that remain stationary relative to the image sensor.

For large digital stills cameras (DSCs), such relational movements are often achieved by moving one intermediate component, such as a cylinder disposed around the lens that rotates about the optical axis. The cylinder may then has plural grooves on its inner surface to act as cam profiles, at least one groove for each moving lens group. In this way the rotation of the cylinder with a single actuator can achieve the controlled relational movement between different lens groups relative to the image sensor. Such mechanisms work well for DSCs, but are not suited to miniature cameras for several reasons. The most important reasons include manufacturing tolerances and associated clearances, and parasitic frictions and forces, and size constraints. For miniature cameras, the positional tolerances required for placing the lens groups are extremely tight; of the order of 10 um. This includes factors such as relative tilt between the lens groups, and the decenter relative to the nominal optical axis.

Unfortunately, for such precision mechanisms, manufacturing tolerances do not scale with size, and so a decenter error caused by a clearance between cam groove and pin follower on the lens group may be acceptable for a larger DSC, but unacceptable for a miniature camera.

SUMMARY OF EMBODIMENTS

Some embodiments provide a zoom actuator system. Some embodiments include a fixed chassis structure and a moveable carriage body. The moveable carriage body carries one or more lenses. The moveable carriage body is movably mounted to the chassis structure so as to limit a plurality of degrees of freedom of movement of the moveable carriage body but to allow movement along an optical axis through the one or more lenses. An inertial actuator is mounted to the moveable carriage body in an alignment such that the axis of motion of the actuator is parallel to at least one allowed degree of freedom. The moveable carriage body is held in place with respect to the at least one allowed degree of freedom by one or more friction forces received at one or more mechanical contacts with the chassis structure. The inertial actuator is actionable to overcome the friction forces, and an inertial mass is mounted to the inertial actuator on a side opposite the carriage body.

Figure 1:
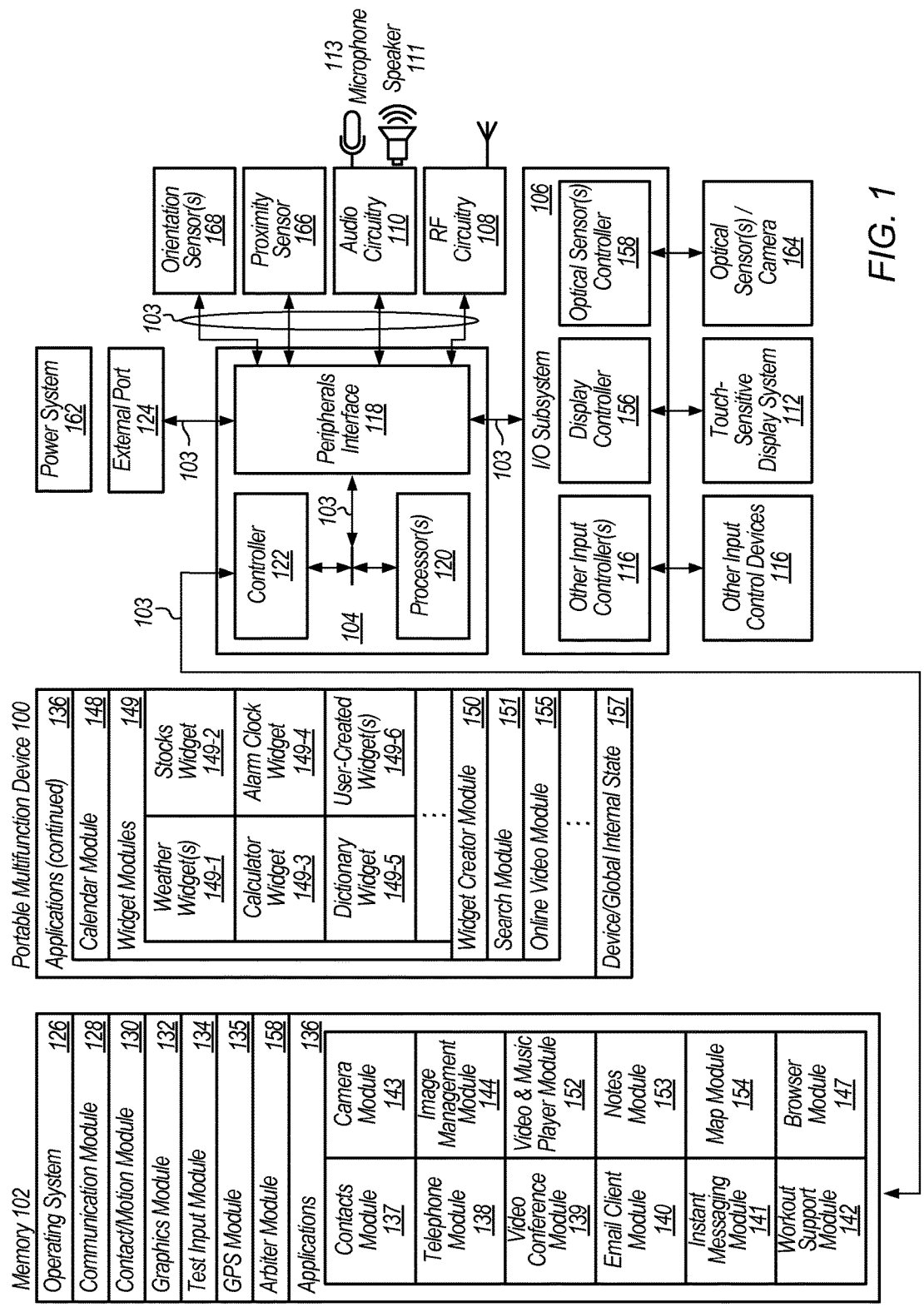
FIG. 1 illustrates a block diagram of a portable multi-function device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be the to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Zoom Actuators

Some embodiments provide a zoom actuator system. Some embodiments include a fixed chassis structure and a moveable carriage body. The moveable carriage body carries one or more lenses. The moveable carriage body is movably mounted to the chassis structure so as to limit a plurality of degrees of freedom of movement of the moveable carriage body but to allow movement along an optical axis through the one or more lenses. An inertial actuator is mounted to the moveable carriage body in an alignment such that the axis of motion of the actuator is parallel to at least one allowed degree of freedom. The moveable carriage body is held in place with respect to the at least one allowed degree of freedom by one or more friction forces received at one or more mechanical contacts with the chassis structure. The inertial actuator is actionable to overcome the friction forces, and an inertial mass is mounted to the inertial actuator on a side opposite the carriage body.

In some embodiments, the moveable carriage body receives power and control signals to the inertial actuator through a flexible printed circuit. Some embodiments include a driver circuit mounted on the moveable carriage body. The moveable carriage body receives power and control signals for the driver circuit to the inertial actuator through a flexible printed circuit. Some embodiments include a driver circuit mounted on the moveable carriage body, and a position sensor, mounted on the moveable carriage body, for determining a position of the moveable carriage body. In some embodiments, the position sensor is connected to the driver circuit for reporting position information to the driver circuit.

In some embodiments, the inertial actuator comprises a piezoelectric actuator. In some embodiments, the moveable carriage body contacts the chassis along multiple conductive tracks for transmitting power and control signals to the inertial actuator. The system further includes a spring mounted to the moveable carriage body to generate a contact force at the one or more conductive tracks so as to generate a friction force between the moveable carriage body and the multiple conductive tracks. Some embodiments further include a driver circuit mounted on the moveable carriage body, and a capacitive position sensor, mounted on the moveable carriage body, for determining a position of the moveable carriage body based on a plate capacitance between a plate of the position sensor and a metal pattern track on the chassis.

Some embodiments include a method for controlling camera components. In some embodiments, the method includes applying a first voltage to an inertial actuator attached to a moveable lens carriage body. The inertial actuator is a piezoelectric element, and the first voltage causes an expansion of the piezoelectric element. In some embodiments, the method further includes applying a second voltage to the inertial actuator attached to a moveable lens carriage body. The second voltage causes a contraction of the piezoelectric element, and the contraction is slower than the expansion.

In some embodiments, the method further includes applying a third voltage to an inertial actuator attached to a moveable lens carriage body. The third voltage causes a contraction of the piezoelectric element. In some embodiments, the method further includes applying a fourth voltage to the inertial actuator attached to a moveable lens carriage body. The fourth voltage causes an expansion of the piezoelectric element, and the expansion is slower than the contraction.

In some embodiments, the method further includes measuring a position of the moveable lens carriage body using a capacitive sensor attached to the moveable lens carriage body. In some embodiments the applying a first voltage and the applying a second voltage further comprise driving an inertial actuator attached to the moveable lens carriage body with an asymmetric oscillatory electrical signal so that in one half of the cycle the inertial acceleration is higher than in the other.

In some embodiments, the applying a first voltage and the applying a second voltage further comprise driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and the chassis structure to cause sliding in an allowed linear degree of freedom.

In some embodiments, the applying a first voltage and the applying a second voltage further comprise driving an inertial actuator attached to the moveable lens carriage body with an asymmetric oscillatory electrical signal having a sawtooth waveform.

In some embodiments, the method further includes driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

Some embodiments may include camera module including a means for applying a first voltage to an inertial actuator attached to a moveable lens carriage body, and applying a second voltage to the inertial actuator attached to a moveable lens carriage body, as described herein. The camera module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform applying a first voltage to an inertial actuator attached to a moveable lens carriage body, and applying a second voltage to the inertial actuator attached to a moveable lens carriage body, as described herein. Other embodiments of the non-uniform camera module may be at least partially implemented by hardware circuitry and/or firmware stored, for example, in a non-volatile memory.

Some embodiments provide a zoom actuator system. In some embodiments, a moving body slides on a fixed chassis structure. In some embodiments, the fixed chassis structure substantially limits the motion of the moving body to one linear degree of freedom.

In some embodiments, the moving body contacts the chassis at multiple discrete points so as to constrain the motion, and at least portions of each of these contact points provide conduits to make electrical connections between the chassis and the moving body. In some embodiments, at least one of these contact points is sprung relative to the moving body so as to generate a contact force at others of the contact points, so as to generate a sufficient friction force to both prevent any unwanted sliding at the contact points, and also to ensure adequate electrical connectivity. In some embodiments, there is mounted on the moving body an inertial actuator, which when actuated with appropriate electrical signals can generate inertial loads that exceed the static friction of the contacts points and yield motion in the allowed linear degree(s) of freedom.

In some embodiments, the inertial actuator is driven with an asymmetric oscillatory electrical signal so that in one half of the cycle the inertial acceleration is higher than in the other, and during at least a portion of the oscillatory motion, the inertial forces exceed the static friction of the contact points and cause sliding in the allowed linear degree of freedom.

In some embodiments, multiple such oscillatory cycles, in combination, yield a net motion motion of the moving body in one direction relative to the chassis, and the reverse motion can be achieved by appropriately altering the asymmetric electrical signal.

In some embodiments, a programmable driver circuit for the inertial actuator is also mounted on the moving body. In some embodiments, connections to power the driver circuit are provided through the multiple electrical contacts via the contact points, at least two include a positive power terminal and a negative power terminal to power and deliver digital commands to the driver circuit so as to determine how to move the inertial actuator.

In some embodiments, the moving body includes a lens group as part of a lens system, and the allowed linear degree of freedom is parallel to the lens optical axis. In some embodiments, the actuator system is used to appropriately move a lens groups in a zoom lens. In some embodiments, multiple moving bodies move along the same tracks in the same chassis. In some embodiments position sensors are incorporated on each of the multiple moving bodies, so as to measure the position of each moving body in the chassis.

In some embodiments, a patterned conductive trace forms part of the chassis, and interacts with a conductive plate on the moving body to create a capacitance sensor, such that the capacitance of the sensor is measured as the moving body moves in the chassis, and the current and historical measurements can be used to assess position of the moving body.

In some embodiments, a zoom actuator system includes a fixed chassis structure and a moving carriage body. In some embodiments, the moving carriage body carries one or more lenses. In some embodiments, the moving carriage body is movably mounted to the chassis structure so as to limit degrees of freedom of movement of the moving carriage body to one or more allowed degrees of freedom. An inertial actuator is mounted to the moving carriage body in an alignment such that the axis of motion of the actuator is parallel to at least one of the one or more allowed degrees of freedom. An inertial mass is mounted to the inertial actuator on a side opposite the carriage body.

In some embodiments, the moving carriage body contacts the chassis along multiple conductive tracks for transmitting power and control signals to the inertial actuator. Some embodiments further include a driver circuit mounted on the moving carriage body. In some embodiments, the moving carriage body contacts the chassis along multiple conductive tracks for transmitting power and control signals to the inertial actuator, and the driver circuit.

Some embodiments further include a driver circuit mounted on the moving carriage body, and a position sensor, mounted on the moving carriage body, for determining a position of the moving carriage body, such that the position sensor is connected to the driver circuit for reporting position information to the driver circuit. In some embodiments, the inertial actuator comprises a piezoelectric actuator.

In some embodiments, the moving carriage body contacts the chassis along multiple conductive tracks for transmitting power and control signals to the inertial actuator, and the system further includes spring mounted to the moving carriage body to generate a contact force at the one or more conductive tracks so as to generate a friction force between the moving carriage body and the multiple conductive tracks.

In some embodiments, the system further includes a driver circuit mounted on the moving carriage body, and a capacitive position sensor, mounted on the moving carriage body, for determining a position of the moving carriage body based on a plate capacitance between a plate of the position sensor and a metal pattern track on the chassis.

Some embodiments further include a method for operating a zoom actuator. In some embodiments, the method includes applying a first voltage to an inertial actuator attached to a moveable lens carriage body. In some embodiments, the inertial actuator is a piezoelectric element, and the first voltage causes an expansion of the piezoelectric element. In some embodiments, the method further includes applying a second voltage to the inertial actuator attached to a moveable lens carriage body. In some embodiments, the second voltage causes a contraction of the piezoelectric element, and the contraction is slower than the expansion.

In some embodiments, the method further includes applying a third voltage to an inertial actuator attached to a moveable lens carriage body. In some embodiments, the third voltage causes a contraction of the piezoelectric element. In some embodiments, the method further includes applying a fourth voltage to the inertial actuator attached to a moveable lens carriage body. The fourth voltage causes an expansion of the piezoelectric element, and the expansion is slower than the contraction.

In some embodiments, the method further includes measuring a position of the moveable lens carriage body using a capacitive sensor attached to the moveable lens carriage body. In some embodiments, the applying a first voltage and the applying a second voltage further include driving an inertial actuator attached to the moveable lens carriage body with an asymmetric oscillatory electrical signal so that in one half of the cycle the inertial acceleration is higher than in the other.

In some embodiments, the applying a first voltage and the applying a second voltage further include driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moving carriage body and the chassis structure to cause sliding in an allowed linear degree of freedom.

In some embodiments, the applying a first voltage and the applying a second voltage further include driving an inertial actuator attached to the moveable lens carriage body with an asymmetric oscillatory electrical signal having a sawtooth waveform.

In some embodiments, the method further includes driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

Some embodiments include a means for controlling a zoom actuator of a camera, as described herein. For example, a camera control module may drive an inertial actuator attached to the moveable lens carriage body with an asymmetric oscillatory electrical signal so that in one half of the cycle the inertial acceleration is higher than in the other, as described herein. The camera control module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform driving an inertial actuator attached to the moveable lens carriage body with an asymmetric oscillatory electrical signal so that in one half of the cycle the inertial acceleration is higher than in the other, as described herein. Other embodiments of the camera control module may be at least partially implemented by hardware circuitry and/or firmware stored, for example, in a non-volatile memory.

Some embodiments include an actuator system, which includes a moveable carriage that slides along surfaces of a fixed support structure. In some embodiments the contact surfaces between the moveable carriage and the fixed support structure collectively substantially constrain five degrees of freedom of motion of the moveable carriage, and the remaining sixth degree of freedom represents linear motion of the moveable carriage along an axis relative to the fixed support structure. In some embodiments the motion is limited by friction between the moveable carriage and the fixed support structure. In some embodiments the contact forces that generate the friction forces are themselves generated by a sprung portion of the moveable carriage that contacts a further surface of the fixed support structure, and the motion of the moveable carriage relative to the fixed support structure is controlled by the operation of an inertial actuator mounted on the moveable carriage. In some embodiments, the inertial actuator includes a linear actuator with direction of motion parallel to the movement axis, fixed at one end to the moveable carriage and at the other to an inertial mass. In some embodiments, electrical connection separate separate from the mechanical contact surfaces is provided to the moveable carriage to electrically drive the inertial actuator as appropriate to generate the desired motion.

In some embodiments, the inertial actuator is driven with an asymmetric oscillatory electrical signal so that in one part of the cycle the inertial acceleration of the moveable carriage is higher than in another, and during at least a portion of the oscillatory motion, the inertial forces exceed the static friction of the frictional contacts between the moveable carriage and the fixed support structure and cause sliding in the allowed linear degree of freedom. In combination, multiple such oscillatory cycles yield a net motion of the moveable carriage in one direction relative to the fixed support structure, and the reverse motion can be achieved by appropriately altering the asymmetric electrical signal.

In some embodiments, the programmable driver circuit for the inertial actuator is also mounted on the moveable carriage, and at least four electrical signals are supplied to the moveable carriage, two being electrical power terminals and two being communication terminals to command a desired motion.

In some embodiments, multiple moveable carriages and inertial actuators operate independently along the same guide surfaces of the fixed support structure. In some embodiments, the moveable carriage is used to move one or more optical elements of a miniature camera, such that the axis of motion of the moveable carriage is parallel to the optical axis of the one or more optical elements.

In some embodiments, the inertial actuator includes a piezoelectric element that represents the linear actuator attached to an inertial mass. In some embodiments, capacitive position sensors detect the capacitance between an electrode mounted on the moveable carriage and a patterned electrode mounted on the fixed support structure in such a way that the capacitance varies depending on the position of the moveable carriage.

In some embodiments, the electrode pattern forms an oscillatory pattern along the direction of motion, such that the measured capacitance oscillates as the moveable carriage moves along the axis of motion in a given direction, so that a coarse measure of position from a given home position is determined by counting the number of oscillatory cycles, and a fine measure of position is determined by the actual measured capacitance within one oscillatory cycle of capacitance.

Some embodiments include an actuator system for a moveable carriage that slides along surfaces of a fixed support structure. In some embodiments, the contact surfaces between the moveable carriage and the fixed support structure collectively substantially constrain up to five degrees of freedom of motion of the moveable carriage, and the remaining sixth degree of freedom represents linear motion of the moveable carriage along an axis relative to the fixed support structure. In some embodiments, the motion is limited by friction between the moveable carriage and the fixed support structure.

In some embodiments the contact forces that generate the friction forces are themselves generated by a sprung portion of the moveable carriage that contacts a further surface of the fixed support structure. In some embodiments, the motion of the moveable carriage relative to the fixed support structure is controlled by the operation of an inertial actuator mounted on the moveable carriage, which includes linear actuator with direction of motion parallel to the movement axis, fixed at one end to the moveable carriage and at the other to an inertial mass. In some embodiments, separate electrical connection means is provided to the moveable carriage to electrically drive the inertial actuator as appropriate to generate the desired motion.

In some embodiments, the inertial actuator is driven with an asymmetric oscillatory electrical signal so that in one part of the cycle the inertial acceleration of the moveable carriage is higher than in another, and during at least a portion of the oscillatory motion, the inertial forces exceed the static friction of the frictional contacts between the moveable carriage and the fixed support structure and cause sliding in the allowed linear degree of freedom. In combination, multiple such oscillatory cycles yield a net motion of the moveable carriage in one direction relative to the fixed support structure, and wherein the reverse motion can be achieved by appropriately altering the asymmetric electrical signal.

In some embodiments, the programmable driver circuit for the inertial actuator is also mounted on the moveable carriage, and at least four electrical signals are supplied to the moveable carriage, two being electrical power terminals and two being communication terminals to command a desired motion. In some embodiments, plural such moveable carriages and inertial actuators operate independently along the same guide surfaces of the fixed support structure.

In some embodiments, the moveable carriage is used to move one or more optical elements of a miniature camera, such that the axis of motion of the moveable carriage is parallel to the optical axis of the one or more optical elements. In some embodiments, the inertial actuator includes a piezoelectric element that is a linear actuator attached to an inertial mass.

In some embodiments, capacitive position sensors detect the capacitance between an electrode mounted on the moveable carriage, and a patterned electrode mounted on the fixed support structure in such a way that the capacitance varies depending on the position of the moveable carriage. In some embodiments, the electrode pattern forms an oscillatory pattern along the direction of motion, such that the measured capacitance oscillates as the moveable carriage moves along the axis of motion in a given direction, so that a coarse measure of position from a given home position is determined by counting the number of oscillatory cycles, whilst a fine measure of position is determined by the actual measured capacitance within one oscillatory cycle of capacitance.

Introduction to Piezoelectric Materials

The piezoelectric effect is understood as the linear electromechanical interaction between the mechanical and the electrical state in crystalline materials with no inversion symmetry. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical strain resulting from an applied electrical field). For example, lead zirconate titanate crystals will generate measurable piezoelectricity when their static structure is deformed by about 0.1% of the original dimension. Conversely, those same crystals will change about 0.1% of their static dimension when an external electric field is applied to the material.

A piezoelectric actuator converts an electrical signal into a precisely controlled physical displacement (stroke). If displacement is prevented, a useable force (blocking force) will develop. The precise movement control afforded by piezoelectric actuators is used to finely adjust machining tools, lenses, mirrors, or other equipment. Piezoelectric actuators are also used to control hydraulic valves, act as small-volume pumps or special-purpose motors, and in other applications requiring movement or force.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system or zoom camera system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164, which may include zoom actuators as described herein. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors.

Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers.

The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
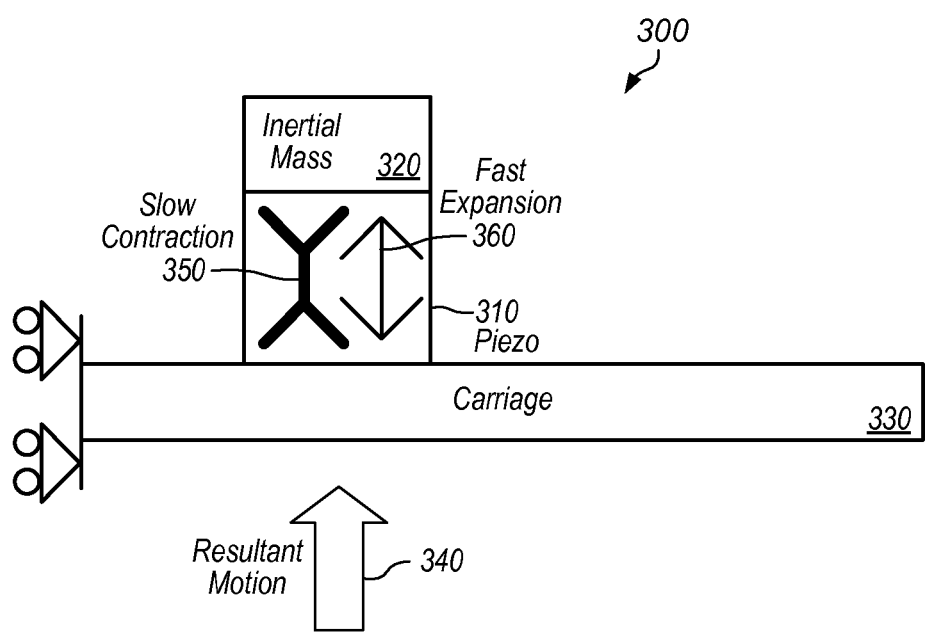
FIG. 3 depicts schematic operation of an inertial actuator, according to some embodiments.

In some embodiments, the software components stored in memory 102 include operating system 126, communication module (or set of instructions) 128, contact/motion module module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player
module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102. Some embodiments of camera module 143 include instructions for control of a zoom lens actuator, as described herein.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as a portable MP3 player, or other digital audio player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad. touchpad.

Figure 2:
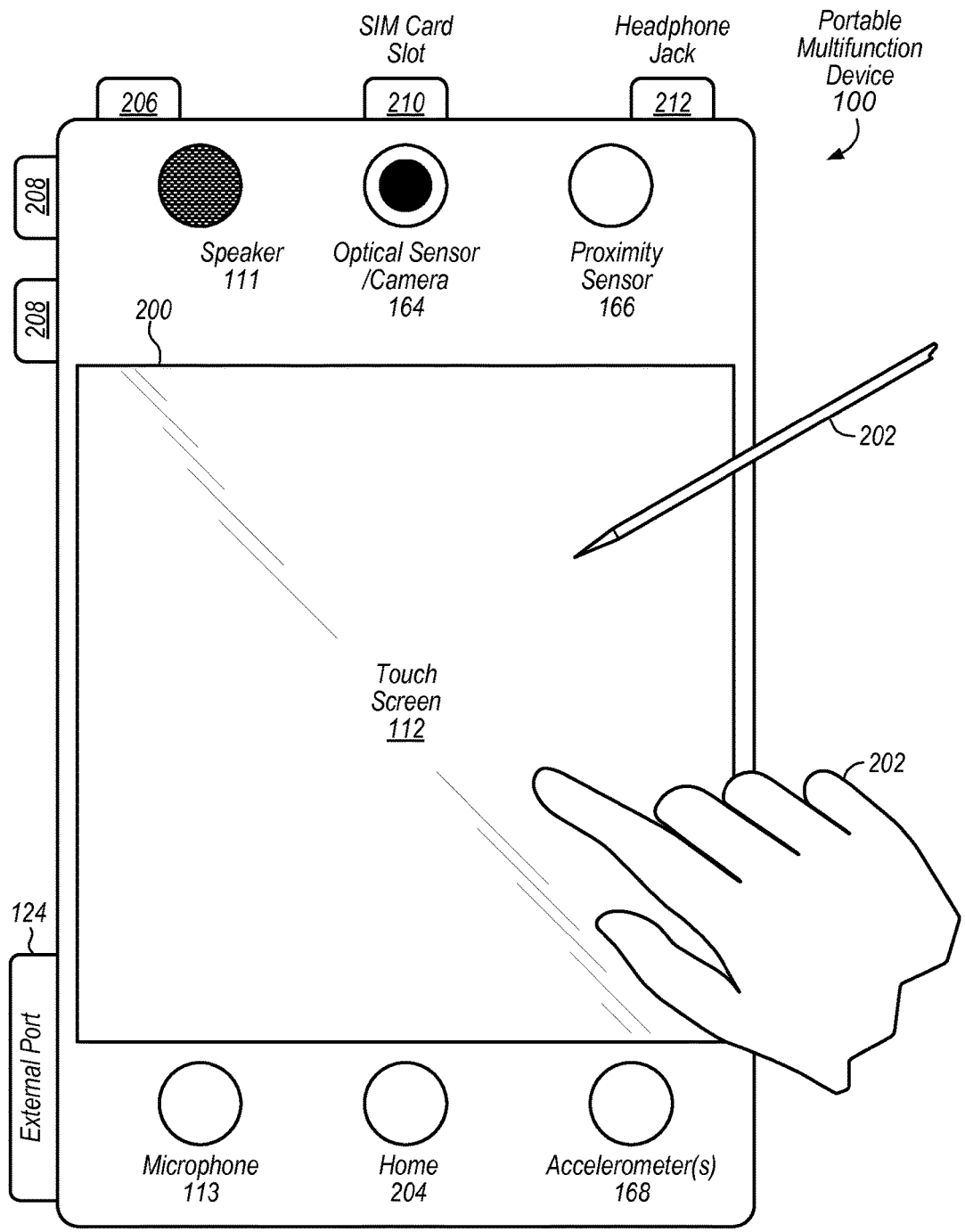
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 on the front of a device such as a tablet computer or telephone, a rear-facing camera or optical sensor that is pointed opposite from the display may be used instead of optical sensor/camera 164 on a front surface. Other portable electronic devices, such as laptops or tablet computers with cameras, may also be used. It should also be understood that, in some embodiments, the device is not a portable communications device, but is a desktop or laptop computer with a camera. In some embodiments, the device is a gaming computer with cameras (e.g., in a gaming controller). It should also be noted that the terms moving and movable are used interchangeably herein.

Zoom Actuator Mechanism

Some embodiments provide a zoom actuator system. In some embodiments, a moving body slides on a fixed chassis structure. In some embodiments, the fixed chassis structure substantially limits the motion of the moving body to one linear degree of freedom.

Some embodiments minimize the number of components in the tolerance stack between lens groups, and reduce or eliminate clearances that can cause an uncertainty in position of the lens groups, such as may be observed with a change in camera orientation.

Unlike other miniature camera actuator mechanisms, such as for auto-focus (AF) and Optical Image Stabilization (OIS), the movement of the different lens groups tends much greater, when normalized with for example the image sensor size, with the result that it is frequently impractical to use an arrangement of resilient flexures to suspend the moving lens group and guide its motion, and some friction is generated as each lens group is slid up and down some kind of guide structure.

Friction creates issues such as wear and positional accuracy, but some embodiments employ the presence of friction to provide some useful features. In some embodiments, the friction is designed to be great enough to support the weight of the lens group and moving portion of the mechanism. Thus, in some embodiments, once positioned, the actuator consumes less power to maintain position. Some embodiments are designed such that a spring or some other arrangement is used to generate the normal contact load between the moving portion and fixed guide structure, such that some clearances can be eliminated improving positional accuracy of the lens group.

Some embodiments are designed using shapes and materials such that the sliding frictional interface acts as an electrical conduit between the fixed structure and moving portion and hence allows electrical or electro-mechanical components to be mounted on the moving portion.

In some embodiments, the only contact between the moving portion and the fixed structure of the actuator is through the frictional interface, which makes the actuator much more robust against very high external accelerations, such as those very high external accelerations experienced, for example, when the multifunction device is dropped onto the floor. In some embodiments, one class of actuator mechanisms involves an actuator (for example a motor) mounted on the fixed portion of the actuator, and then a drive train (for example a leadscrew and nut) to convert this motion to a linear motion of the lens group. In some embodiments, the actuator is designed to achieve the driving force through the frictional contact surfaces, such that high accelerations result in slippage of the moving portion on its guide structure, rather than high loads that might otherwise damage components.

In some embodiments, the same fixed guide structures are used for plural moving portions that can move independently. In some embodiments, the presence and use of friction means that positional accuracy is less certain, and hence a position sensing means is incorporated for each moving portion.

Non-limiting embodiments of the present invention will now be presented with the aid of the accompanying illustrations. In some embodiments, the basic operation of the actuator is to use piezo (piezoelectric element) as an inertial exciter. FIG. 3 depicts schematic operation of an inertial actuator, according to some embodiments. An actuator assembly 300 includes a piezo 310 situated between an inertial mass 320 and a moving body 330. Motion 340 of moving body 330 is generated by slowly expanding 350 and quickly contracting 360 piezo 310.

Figure 4:
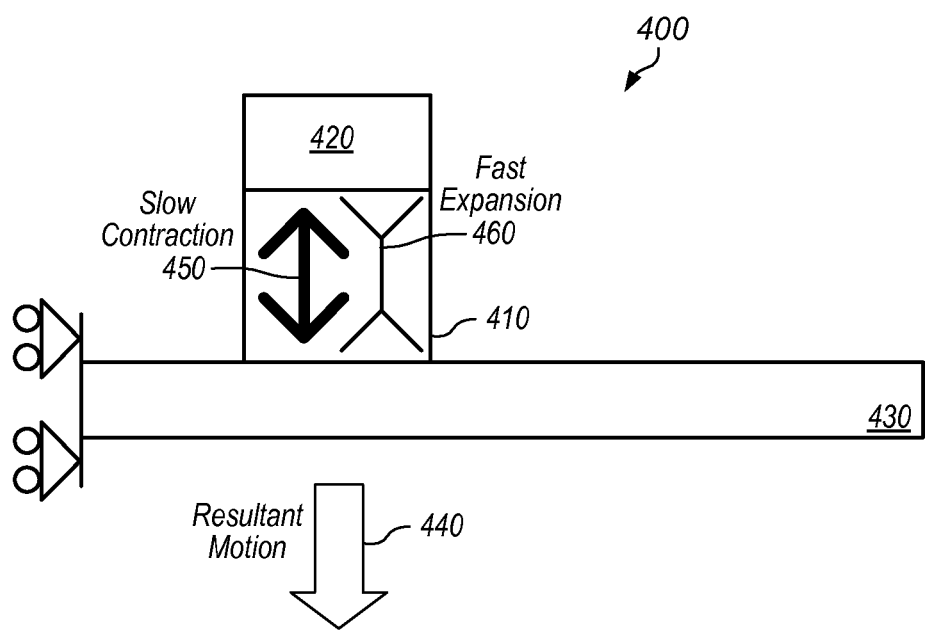
FIG. 4 illustrates schematic operation of an intertial actuator, according to some embodiments.

FIG. 4 illustrates schematic operation of an inertial actuator, according to some embodiments. An actuator assembly 400 includes a piezo 410 situated between an inertial mass 420 and a moving body 430. Motion 440 of moving body 430 is generated by slowly contracting 450 and quickly expanding 460 piezo 410. On one side, piezo 410 is joined to moving body 430, which may include a lens group of a zoom lens apparatus. On the other side is inertial mass 420. By dynamically deforming the shape of piezo 410 in response to applied voltages, piezo 410 accelerates inertial mass 420. The inertial forces for motion 440 are transmitted to the moving body.

Figure 5:
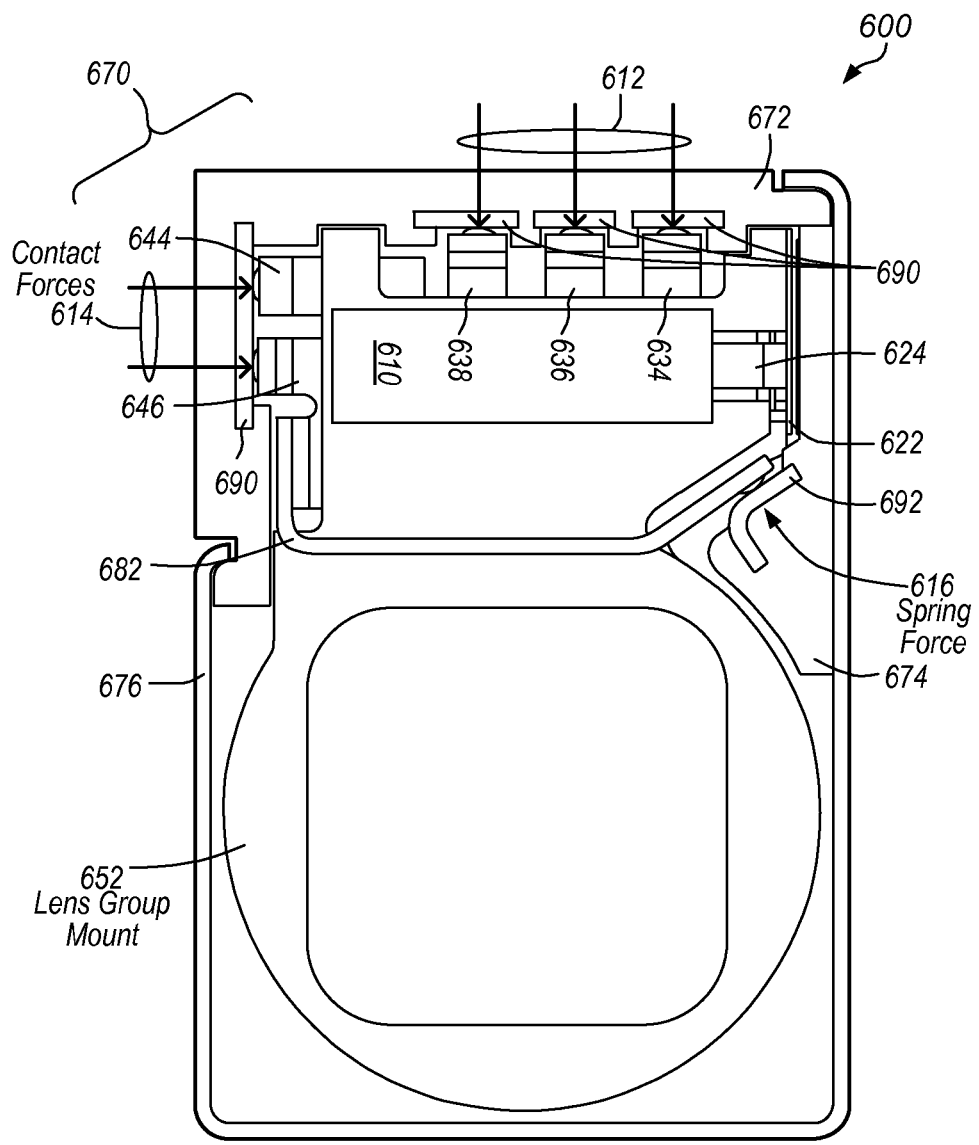
FIG. 5 illustrates segment of a long-throw actuator, according to some embodiments.

FIG. 5 illustrates segment of a long-throw actuator, according to some embodiments. A zoom actuator system 500 includes a chassis 570, composed of a first molded portion 572 and a second molded portion 574, to which a moving actuator carriage 530 is articulated. Moving actuator carriage 530 is shrouded by a cover 576. In the embodiment shown in FIG. 5, a second independent moving actuator carriage 580 is also included. Embodiments vary the length of chassis 570 to fit particular needs. Four metal conductive tracks 590 are shown as inserts molded into first molded portion 572 and a fifth conductive track 592 is molded into second molded portion 574. Four metal conductive tracks 590 provide the contact surfaces for the substantially rigid contact surfaces (e.g. contacts 534-538) on moving actuator carriage 530. The fifth conductive track 592 operates against a spring 532 on moving actuator carriage 530. This contact surface of conductive track 592 and spring 532 set the contact pressure between the tracks 590 and the rigid contacts 534-438 on moving actuator carriage 530.

Chassis 570 provides a structure that includes multiple tracks (e.g., conductive tracks 590 and fifth conductive track 592) to guide the moving actuator carriage 530 along the degree of freedom of interest, which in the case of the zoom actuator 500 is parallel to the optical axis. Moving actuator carriage 530 contains a spring 582 structure, to provide an appropriate normal preload force on all the contact surfaces (e.g. contacts 534-538) between the moving actuator carriage 530 and chassis 570. In this way there is a friction force between the between the moving actuator carriage 530 and chassis 570.

The size of the piezo 510 and inertial mass 520 are chosen such that inertial acceleration forces can overcome the static friction. If driven with a sine wave, which is symmetric, then in the nominal case over time, there will be no net movement. However if the oscillatory waveform is asymmetric, then it can be arranged that in one direction, the inertial forces can overcome the static friction, whilst in the other direction, they are essentially lower and in the ideal case there is no reverse motion. In this way, over multiple cycles, the between the moving actuator carriage 530 and can work its way along the tracks 590 on chassis 570

In the configuration shown in FIG. 5, some embodiments transmit electrical signals to the piezo 510 on the moving actuator carriage 530. This can be achieved by using electrical wiping contacts as the surfaces of contacts 534-538. In some embodiments, a driver integrated circuit (IC) (not shown) for the piezo 510 is also mounted on the moving actuator carriage 530, and digital communication to the driver IC to request a movement is routed via the contacts 534-538. In some embodiments, a convenient communication protocol is I$^2$C, which uses two terminals. I$^2$C is a multi-master serial single-ended computer bus used for attaching low-speed peripherals to a motherboard. In some embodiments, I$^2$C uses two bidirectional open-drain lines, a Serial Data Line (SDA) and a Serial Clock (SCL), pulled up with resistors. Typical voltages used are +5 V or +3.3 V although systems with other voltages are permitted.

The I$^2$C reference design has a 7-bit or a 10-bit (depending on the device used) address space. Common I$^2$C bus speeds are the 100 kbit/s standard mode and the 10 kbit/s low-speed mode, but arbitrarily low clock frequencies are also allowed. Recent revisions of I$^2$C can host more nodes and run at faster speeds (400 kbit/s Fast mode, 1 Mbit/s Fast mode plus or Fm+, and 3.4 Mbit/s High Speed mode). These speeds are more widely used on embedded systems than on PCs. There are also other features, such as 16-bit addressing.

In addition, in some embodiments the driver IC uses two power terminals (typically power and ground). Therefore for this configuration, there are four electrical terminals used by the moving actuator carriage 530. Some embodiments allow multiple moving bodies (e.g., moving actuator carriage 530 and second independent moving actuator carriage 580) to be running on the same conductive tracks 590, by ensuring the driver ICs on moving actuator carriage 530 and second independent moving actuator carriage 580 have different I$^2$C addresses, and hence may communicate on the same I$^2$C bus. Such embodiments allow a lens of second independent moving actuator carriage 580 to be moved relative to a lens in a lens group mounting feature 552 of moving actuator carriage 530. A capacitive position sensing pattern 554 allows the position of each of moving actuator carriage 530 and second independent moving actuator carriage 580 to be independently measured.

Figure 6:
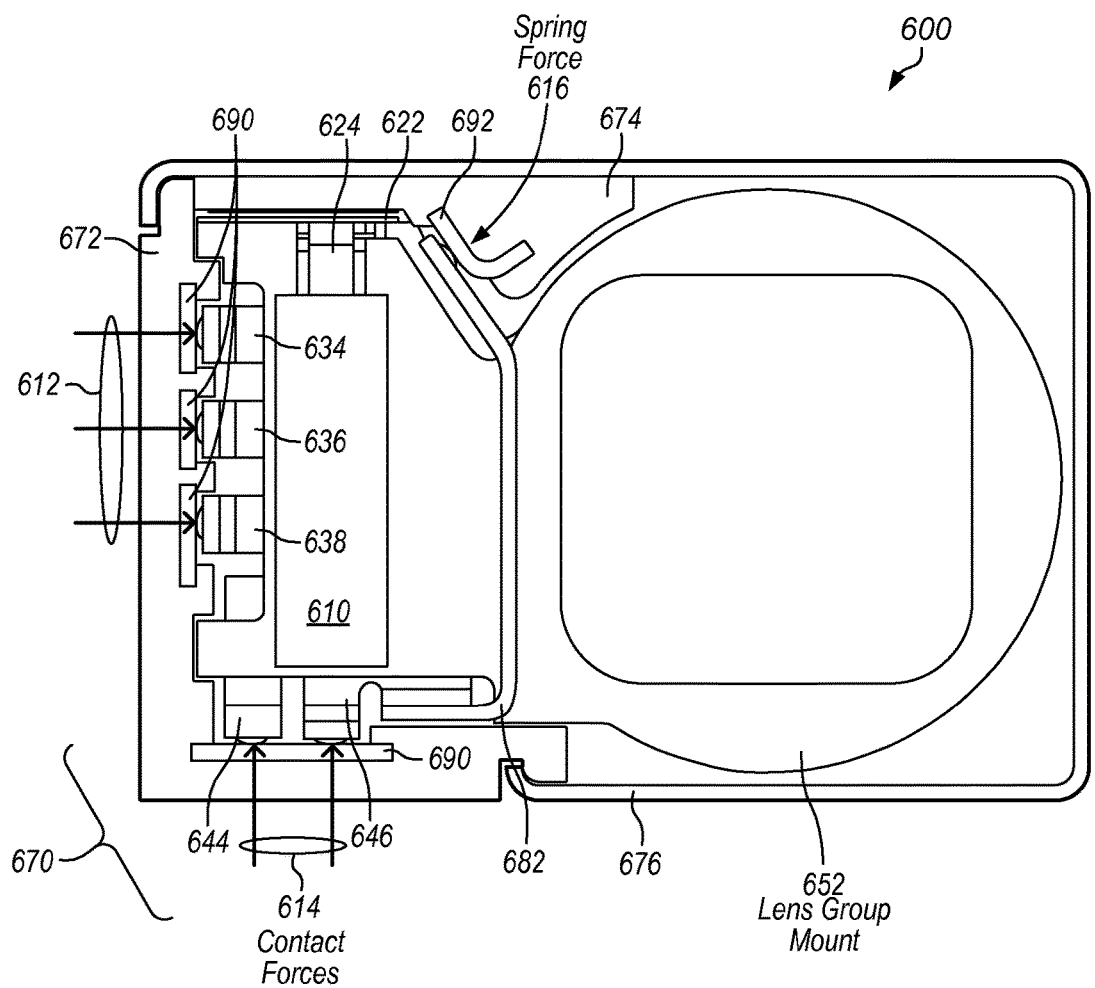
FIG. 6 illustrates a zoom actuator plan view showing contact forces, according to some embodiments.

FIG. 6 illustrates a zoom actuator plan view showing contact forces, according to some embodiments. A zoom actuator system 600 includes a chassis 670, composed of a first molded portion 672 and a second molded portion 674, to which a moving actuator carriage 630 is articulated. Moving actuator carriage 630 is shrouded by a cover 676. A lens group mount 652 is shown within the moving actuator carriage 630 of zoom actuator assembly 600. Chassis 670 provides a structure that includes multiple tracks (e.g., conductive tracks 690 and fifth conductive track 692) to guide the moving actuator carriage 630 along the degree of freedom of interest.

Moving actuator carriage 630 contains a spring 682 structure, to provide an appropriate normal preload force (spring force 616) on in opposition to contact forces 612-614 between the moving actuator carriage 630 and chassis 670. In this way there is a friction force between the between the moving actuator carriage 630 and chassis 670. piezo 610 is shown. A flexible printed circuit 624 and a capacitance sensor 622 are also shown.

In some embodiments, the carriage 630 in the chassis structure 670, and the direction of the contact forces 612-614 on the carriage 630 are shown. In some embodiments, relative to the image sensor (not shown), the carriage 630 in principle has six degrees of freedom; three orthogonal linear directions, and rotations about three orthogonal axes. There are five substantially rigid contacts 634-638 and 644-646) on the carriage 630 to the tracks 690 on the chassis 630, and assuming they remain in contact with the tracks owing to the contact forces, together they constrain the carriage 630 in five degrees of freedom. The remaining degree of freedom is movement in or out of the page as viewed in FIG. 6, which is parallel with the optical axis for a typical zoom configuration. In some embodiments, these five contacts on tracks form a statically determinate set of constraints on the carriage 630, which eliminates ambiguity in the position of the carriage 630, such that carriage 630 adopts a position where surfaces of all five contacts 690 and 692 are in contact, based on the spring force 616, and the locus of such positions is a line parallel to the optical axis.

Figure 7:
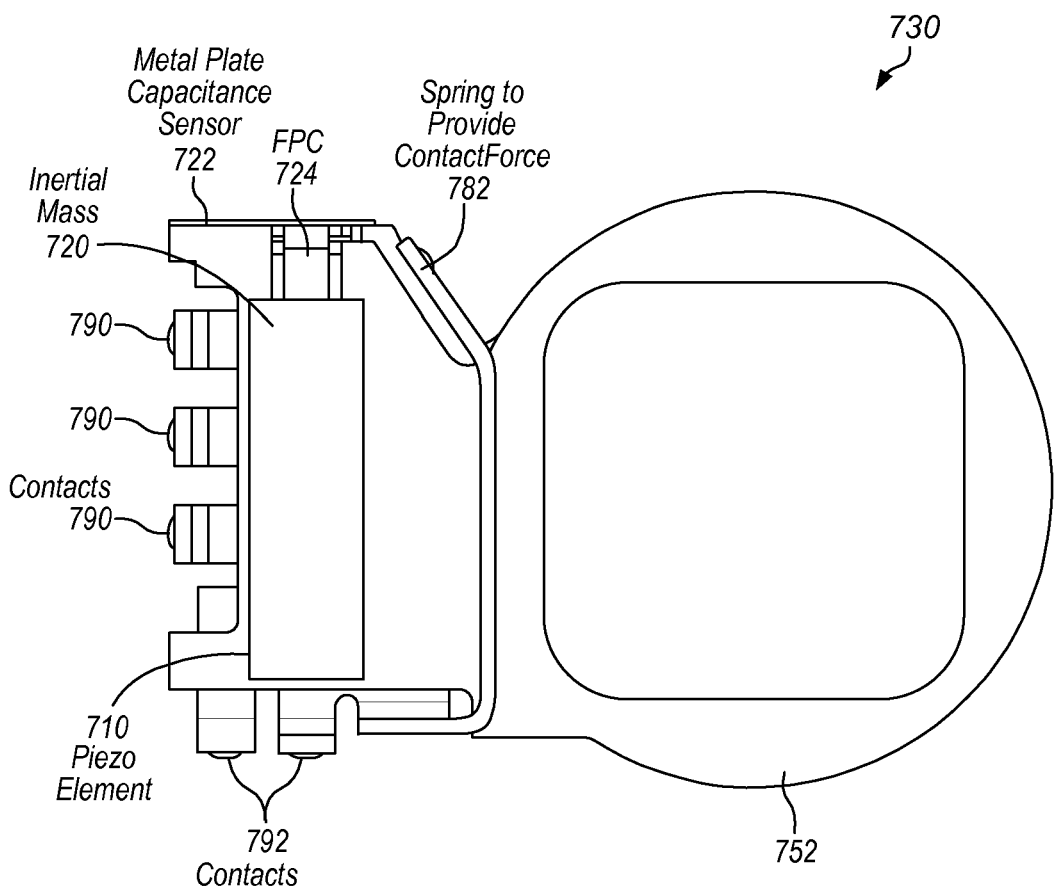
FIG. 7 illustrates a moving actuator carriage, according to some embodiments.

The relative orientation of normal forces may be easiest to understand in reference to FIG. 7. FIG. 7 illustrates a moving actuator carriage, according to some embodiments. Moving actuator carriage 730 includes contacts 790 and 792, a flexible printed circuit 724, a metal plate capacitance sensor 722, inertial mass 720 and piezo 710, as well as spring 782. Contacts 790 have a triangular configuration. When in contact with a plane surface, as formed by the three tracks in the chassis (not shown) contacts 790 collectively constrain the carriage 730 to moves in two dimensions on the plane, or rotate about an axis normal to the plane. In this way, the three contact surfaces of contacts 790 constrain the motion of carriage 730 one linear degree of freedom and two rotary degrees of freedom. Adding a fourth contact surface using contacts 792 on the orthogonal side, as most easily seen in FIG. 12, described below, further constrains the Carriage 730 by an extra degree of freedom, whist the fifth contact surface using contacts 792 eliminates one more.

In some embodiments, there are several advantages to this basic approach. The inertial loads of the lens group in lens group mount 752 are not taken by the piezo 710, which increases robustness. In fact during an impact, the piezo 710 only needs to take the loads of the inertial mass 720, and its own self weight. The actuator (piezo element 710) and carriage 730 are only connected mechanically to the fixed chassis (not shown) via the contact surfaces 790 and 792, such that there is not extra mechanical or electrical tethering. This absence of extra mechanical or electrical tethering aids robustness. Placing the driver IC (not shown) on the carriage 730 and providing the appropriate electrical connections via contacts 790 and 792 allows additional carriages, in some embodiments, to be mounted on the same chassis structure, minimizing size.

In some embodiments, the variability in friction in particular means that position sensor 722 is used required to control the position of the one or more carriages. In some embodiments, this is achieved by using a capacitance sensor 722, comprising a conductive plate mounted to the carriage 730 to form a capacitive coupling to a patterned conductive trace on the chassis structure (see capacitive position sensing pattern 554 in FIG. 5). This trace may ultimately be connected to ground or some other terminal to provide the complete circuit around the capacitor. In some embodiments the shape of this pattern that the effective size of the parallel plate capacitor formed by the overlap between the conductive plate 722 on the carriage and the patterned trace on the chassis oscillates as the carriage 730 moves up and down. The position sensor 722 operates by measuring the capacitance of this parallel plate capacitor. Some embodiments include one or more resistors to be in the capacitor circuit loop, which may for example be mounted on the carriage FPC 724 next to the driver (not shown). From a home position, at maybe one end of travel of the actuator, as the carriage 730 moves along the tracks, the number of capacitance oscillations indicates the gross position of the carriage 730 in the chassis, whereas the actual capacitance value provides a finer measure of position.

In some embodiments, the moving body contacts the chassis at multiple discrete points so as to constrain the motion, and at least a proportion of each of these contact points provide conduits to make electrical connections between the chassis and the moving body. In some embodiments, at least one of these contact points is sprung relative to the moving body so as to generate a contact force at all the contact points, so as to generate a sufficient friction force to both prevent any unwanted sliding at the contact points, and also to ensure adequate electrical connectivity. In some embodiments, there is mounted on the moving body an inertial actuator, which when actuated with appropriate electrical signals can generate inertial loads that exceed the the static friction of the contacts points and yield motion in the allowed linear degree of freedom.

In some embodiments, the inertial actuator is driven with an asymmetric oscillatory electrical signal so that in one half of the cycle the inertial acceleration is higher than in the other, and during at least a portion of the oscillatory motion, the inertial forces exceed the static friction of the contact points and cause sliding in the allowed linear degree of freedom.

In some embodiments, multiple such oscillatory cycles, in combination, yield a net motion of the moving body in one direction relative to the chassis, and the reverse motion can be achieved by appropriately altering the asymmetric electrical signal.

Figure 8:
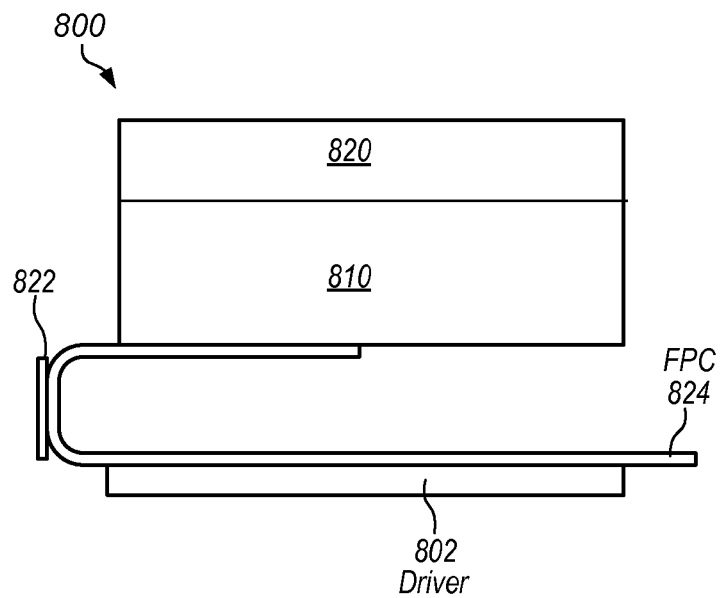
FIG. 8 depicts a subassembly of a moving actuator carriage, according to some embodiments.

FIG. 8 depicts a subassembly of a moving actuator carriage, according to some embodiments. Subassembly 800 includes a driver IC 802, a capacitance sensor 822 and a piezo 810 mounted to FPC 824. Inertial mass 820 is mounted to piezo 810.

Figure 9:
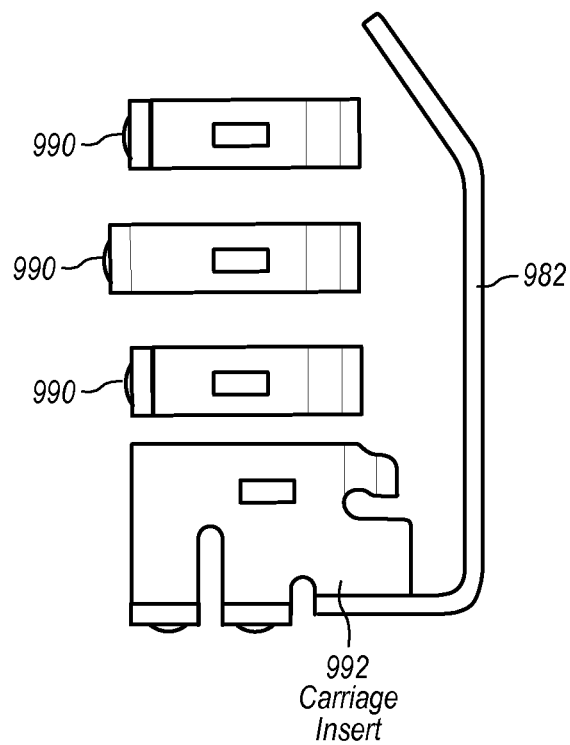
FIG. 9 illustrates carriage construction and features, according to some embodiments.

FIG. 9 illustrates carriage construction and features, according to some embodiments. Spring 982 and contacts 990 and 992 are shown.

Figure 10:
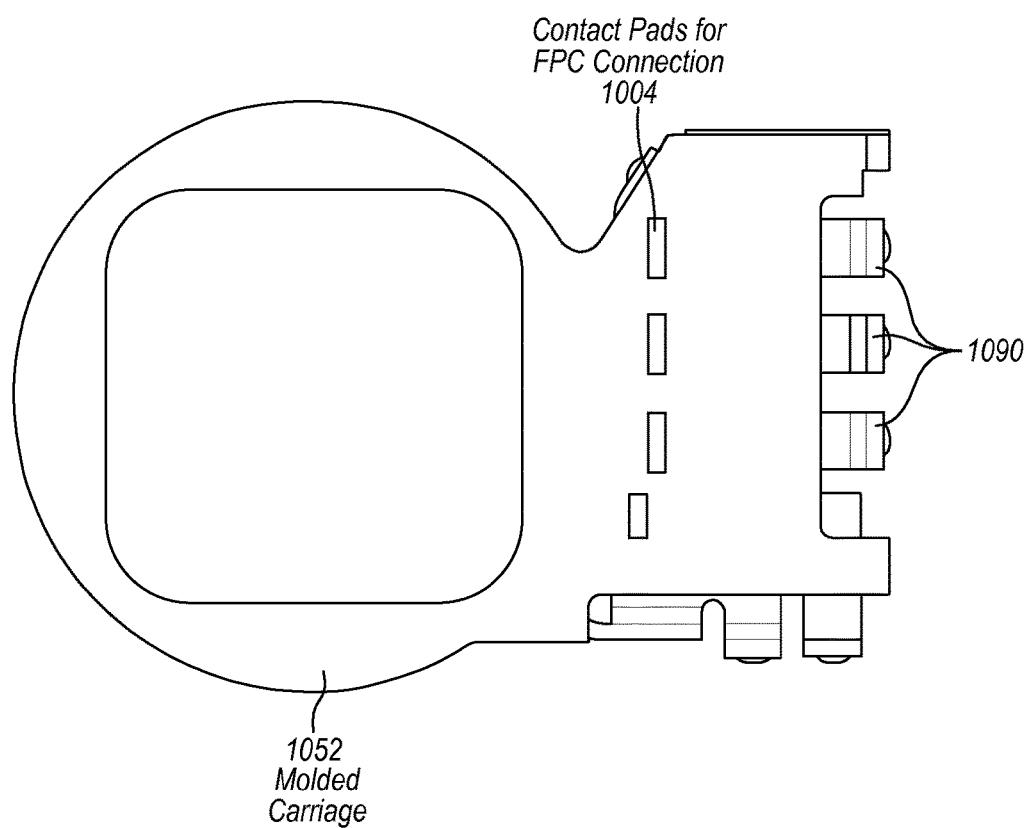
FIG. 10 depicts carriage construction and features, according to some embodiments.

FIG. 10 depicts carriage construction and features, according to some embodiments. A molded carriage 1052 is shown with contacts 1090 and 1092 inserted, such that contact pads for an FPC connection 1004 are exposed.

Figure 11:
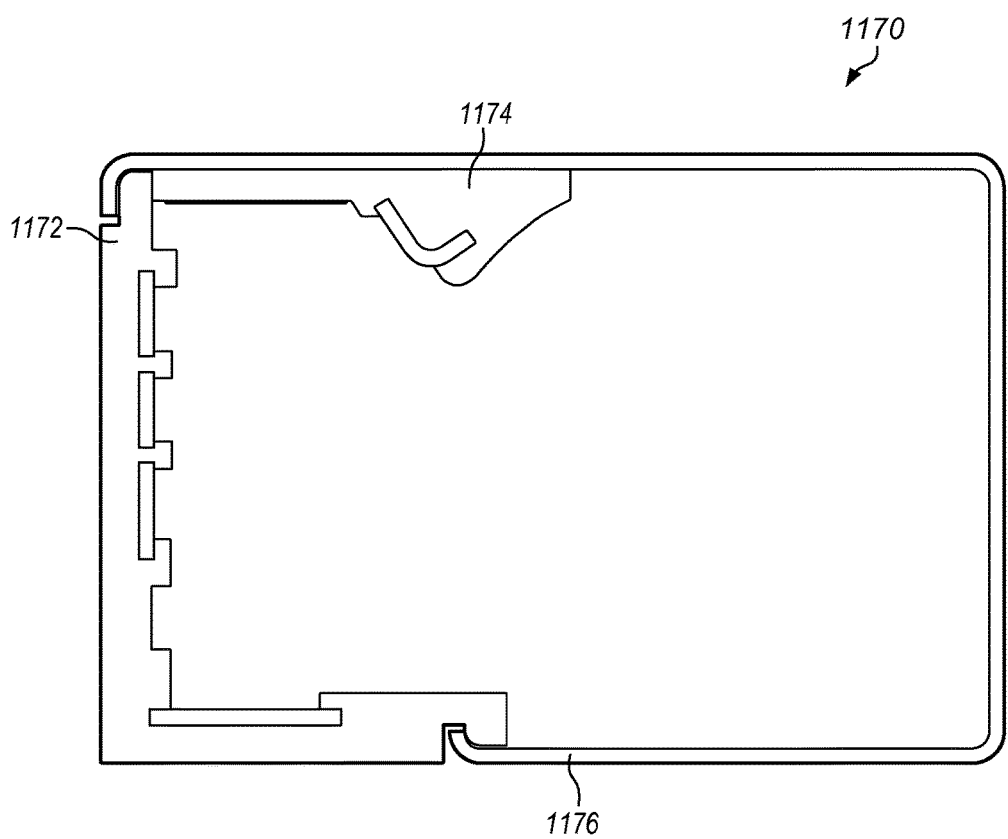
FIG. 11 depicts a chassis assembly without moving carriages, according to some embodiments.

FIG. 11 depicts a chassis assembly without moving carriages, according to some embodiments. A chassis 1170, is composed of a first molded portion 1172 and a second molded portion 1174, to which a moving actuator carriage (not shown) is articulated. The moving actuator carriage is shrouded by a cover 1176.

Figure 12:
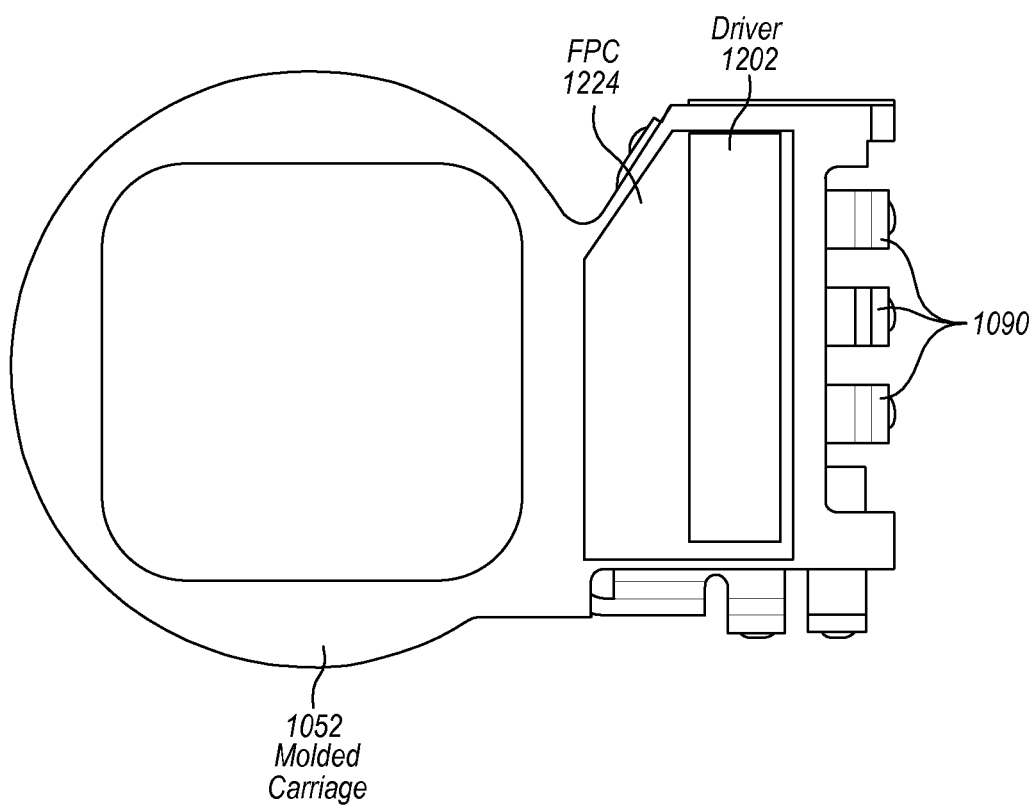
FIG. 12 depicts a moving actuator carriage underside, according to some embodiments.

FIG. 12 depicts a moving actuator carriage underside, according to some embodiments. A molded carriage 1252 is shown with contacts 1290 and 1292 inserted, and FPC 1224 and driver 1202 are connected.

Figure 13:
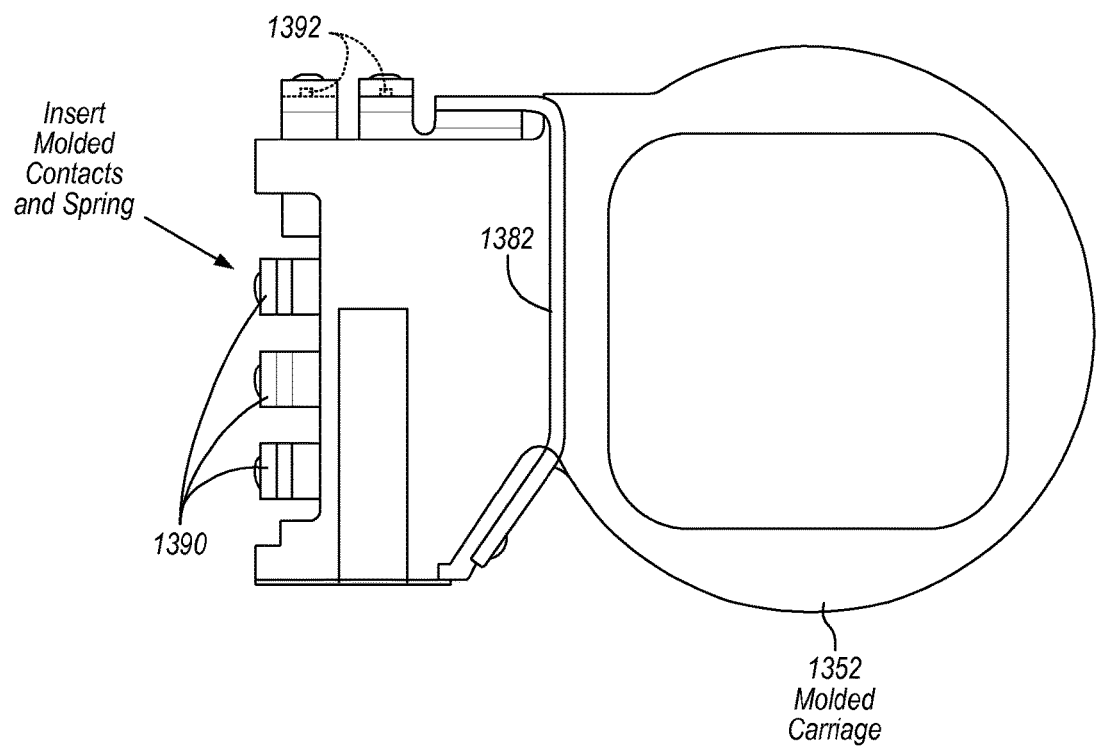
FIG. 13 illustrates a subassembly of a moving actuator carriage, according to some embodiments.

FIG. 13 illustrates a subassembly of a moving actuator carriage, according to some embodiments. A molded carriage 1352 is shown with contacts 1390 and 1392, as well as spring 1382 inserted.

Figure 14A:
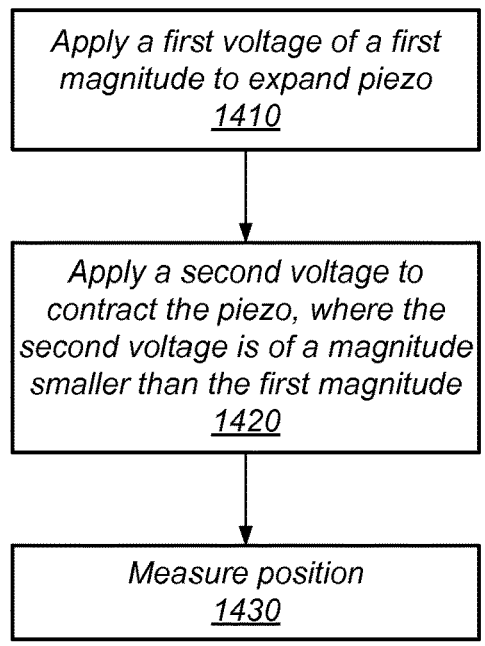
FIG. 14A is a flowchart of a method for operating a zoom actuator, according to one embodiment.

FIG. 14A is a flowchart of a method for operating a zoom actuator, according to one embodiment. A first voltage of a first magnitude is applied to expand a piezo (block 1410). A second voltage is applied to contract the piezo, where the second voltage is of a magnitude smaller than the first magnitude (block 1420). A position of the carriage is measured (block 1430).

Figure 14B:
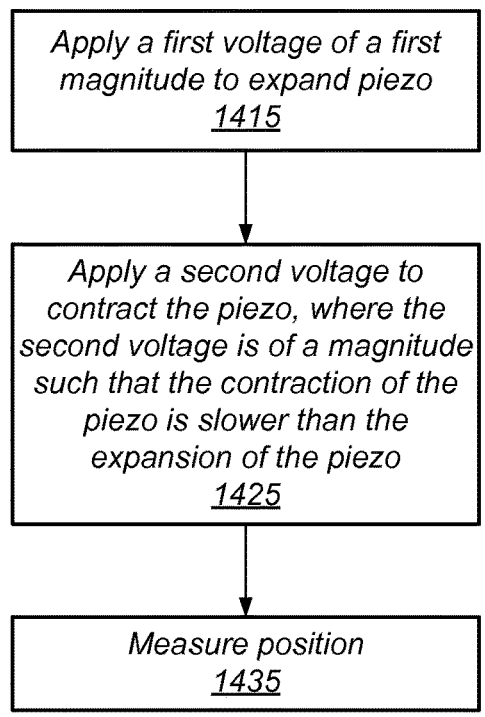
FIG. 14B is a flowchart of a method for operating a zoom actuator, according to one embodiment.

FIG. 14B is a flowchart of a method for operating a zoom actuator, according to one embodiment. A first voltage of a first magnitude is applied to expand a piezo (block 1415). A second voltage is applied to contract the piezo, such that the contraction of the piezo is slower than the expansion of the piezo (block 1425). A position of the carriage is measured (block 1435).

Figure 15A:
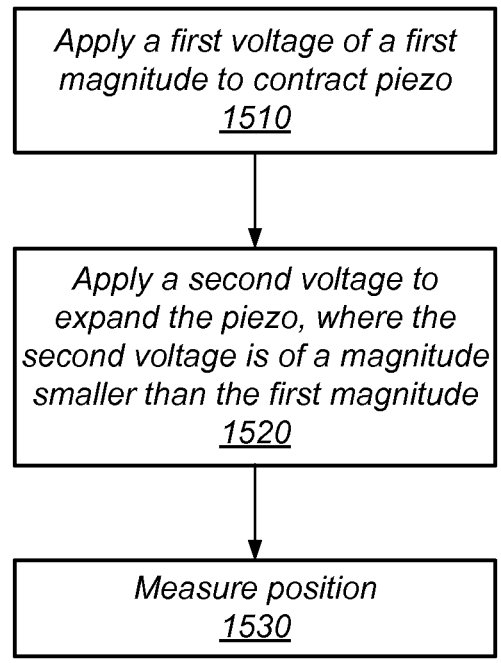
FIG. 15A is a flowchart of a method for operating a zoom actuator, according to one embodiment.

FIG. 15A is a flowchart of a method for operating a zoom actuator, according to one embodiment. A first voltage of a first magnitude is applied to contract a piezo (block 1510). A second voltage is applied to expand the piezo, where the second voltage is of a magnitude smaller than the first magnitude (block 1520). A position of the carriage is measured (block 1530).

Figure 15B:
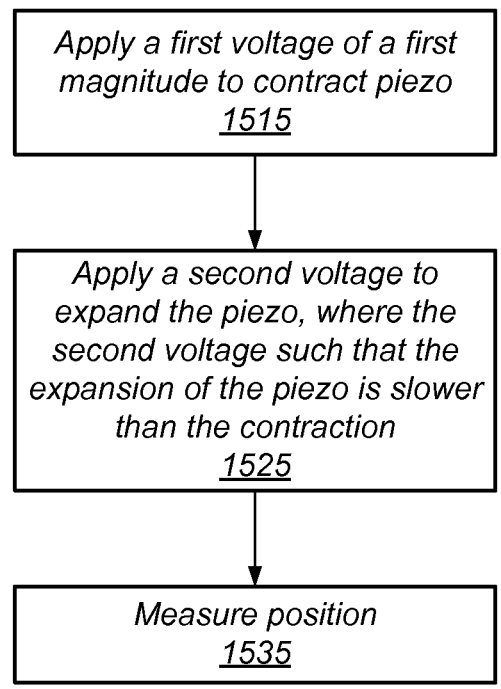
FIG. 15B is a flowchart of a method for operating a zoom actuator, according to one embodiment.

FIG. 15B is a flowchart of a method for operating a zoom actuator, according to one embodiment. A first voltage of a first magnitude is applied to contract a piezo (block 1515). A second voltage is applied to expand the piezo, such that the expansion of the piezo is slower than the contraction (block 1525). A position of the carriage is measured (block 1535).

Figure 16:
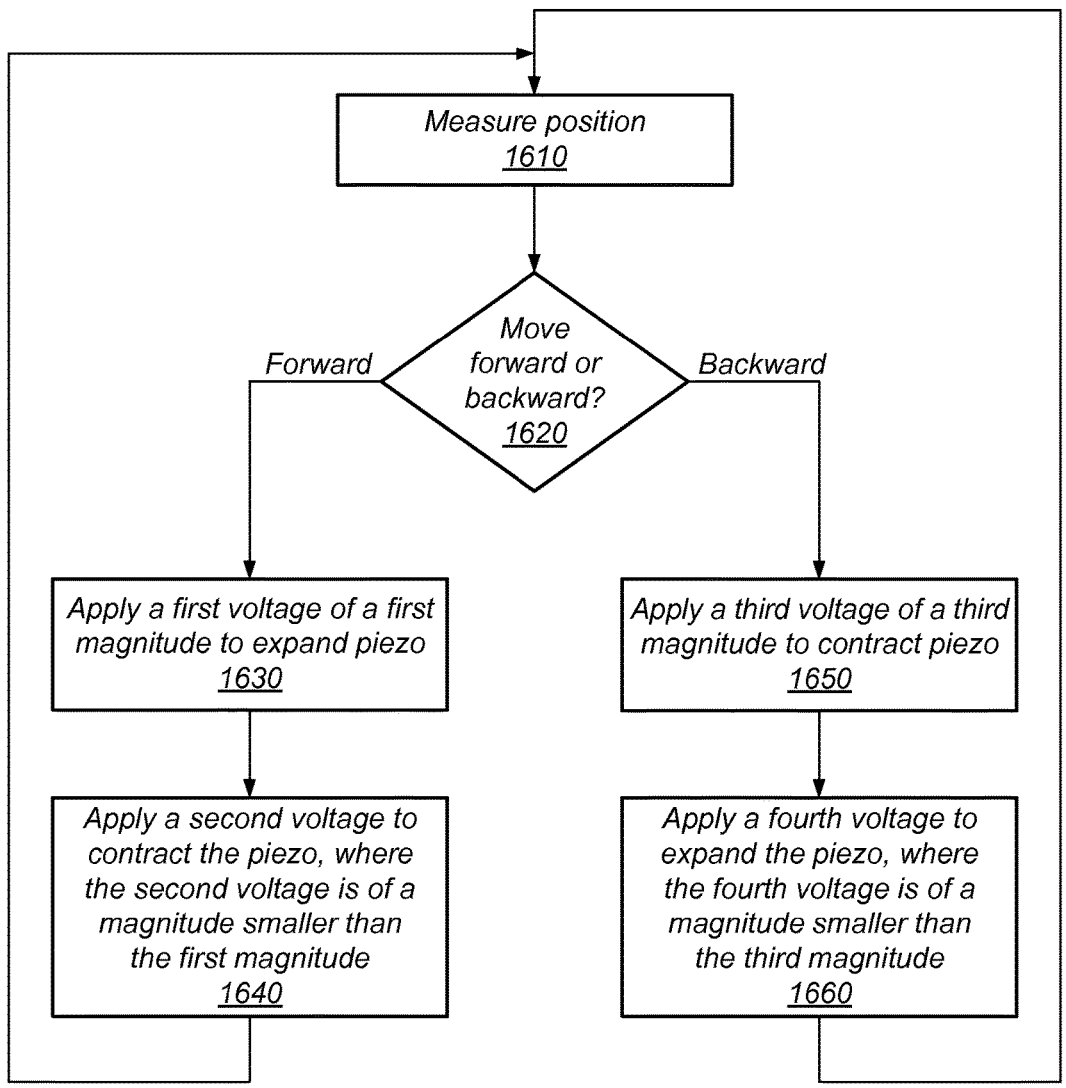
FIG. 16 is a flowchart of a method for operating a zoom actuator, according to one embodiment.

FIG. 16 is a flowchart of a method for operating a zoom actuator, according to one embodiment. A position is measured (block 1610). A determination is made as to whether the carriage needs to move forward or backward (block 1620). If a determination is made that the carriage needs to move backward, then the process proceeds to block 1650, which is described below. If a determination is made that the carriage needs to move forward, then a first voltage of a first magnitude is applied to expand a piezo (block 1630). A second voltage is applied to contract the piezo, where the second voltage is of a magnitude smaller than the first magnitude (block 1640). The process then returns to block 1610, which is described above.

Returning to block 1620, if a determination is made that the carriage needs to move forward, a third voltage of a third magnitude is applied to contract the piezo (block 1650). A fourth voltage is applied to expand the piezo, where the fourth voltage is of a magnitude smaller than the third magnitude (block 1660). The process then returns to block 1610, which is described above.

Figure 17A:
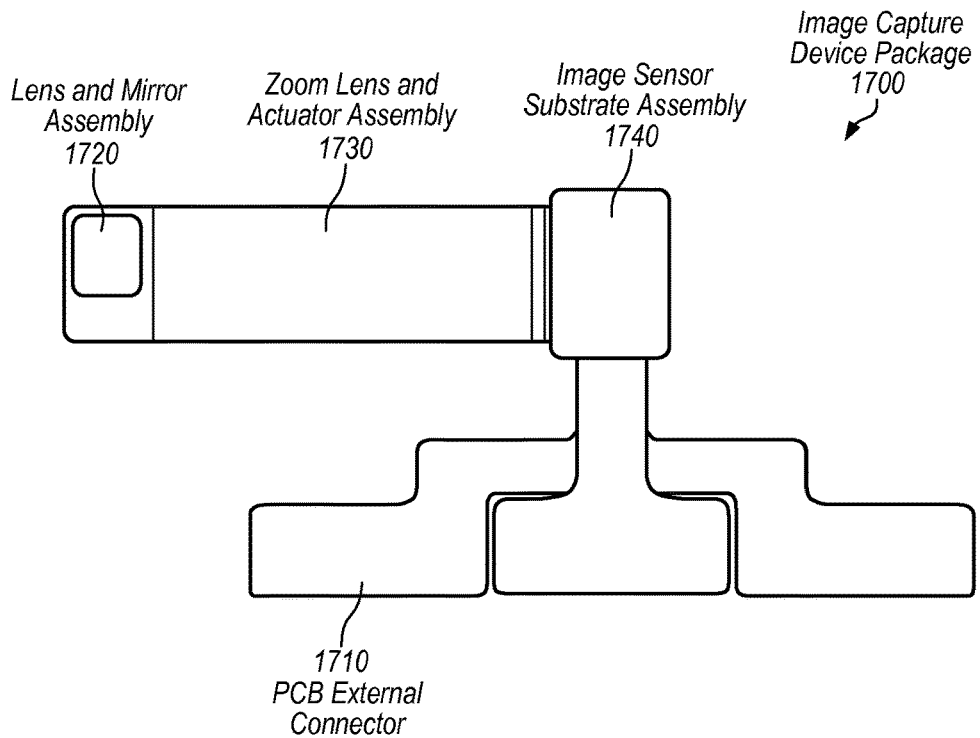
FIGS. 17A-B show perspective views of a completed camera module according to one embodiment.

FIG. 17A depicts components of a camera for use with in portable multifunction device in accordance with some embodiments. A lens and mirror assembly 1720, a zoom lens and actuator assembly 1730, and an image sensor substrate assembly 1740 are shown as components of an image capture device package 1700, which connects to other components of a multifunction device by means of a PCB external connector 1710.

Figure 17B:
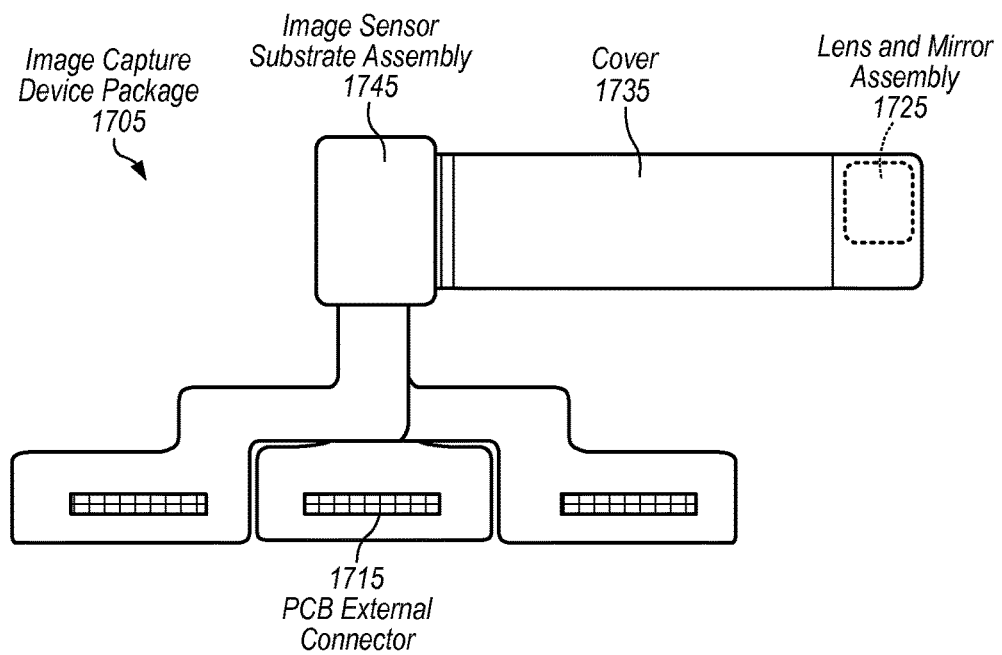

FIG. 17 illustrates a camera for use with in portable multifunction device in accordance with some embodiments. A lens and mirror assembly 1725, a zoom lens and actuator assembly 1735, and an image sensor substrate assembly 1745 are shown as components of an image capture device package 1705, which connects to other components of a multifunction device by means of a PCB external connector 1715. In some embodiments image capture device package 710 has dimensions X=28.5 mm, Y=8.45 mm, Z=5.7 mm, and Z=6.8 mm where the lens emerges. Note that the camera is generally thin in Z, minimally wide in Y, but long in X. Whilst in general, size for the camera should be minimized when used in mobile devices, these dimensions are consistent with the an embodiment of design constraints, where minimizing Z is most important, Y is important, and X is relatively less important.

Figure 18A:
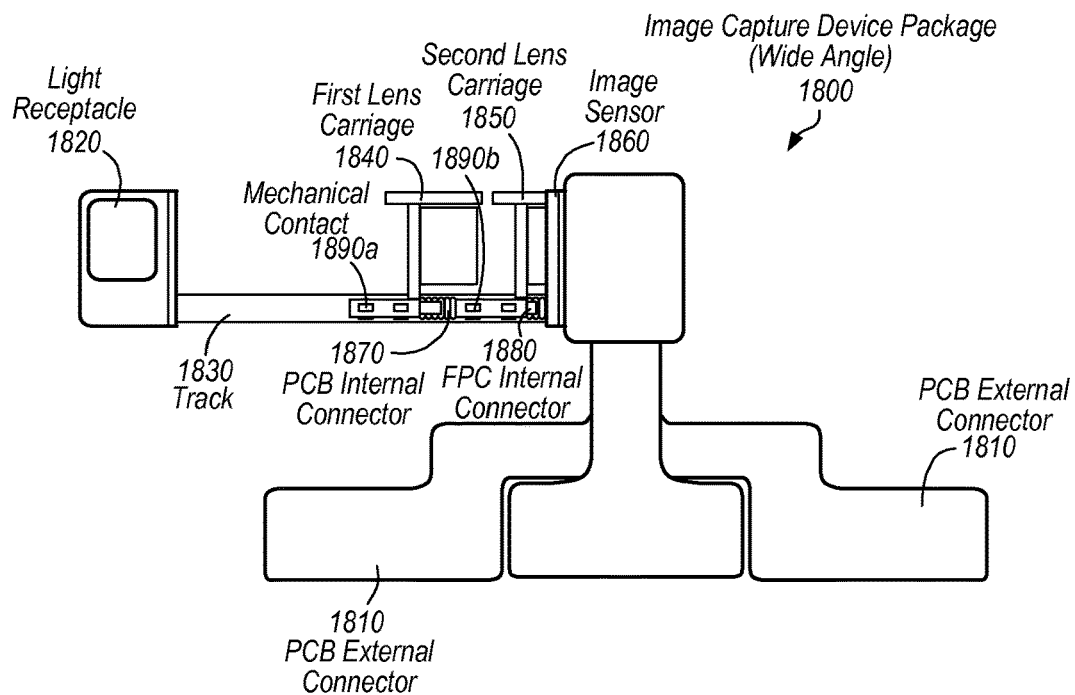
FIGS. 18A-B show perspective views of components of a camera module according to one embodiment.

FIG. 18A depicts a perspective view of components of a camera module according to one embodiment. An image capture device package 1800 is shown with first lens carriage 1840 and second lens carriage 1850 spaced for wide-angle photography on a track 1830 between a light receptacle 1820 and an image sensor 1860. FPC internal connectors 1870 and 1880 connect first lens carriage 1840 and second lens carriage 1850, respectively, to control signals. PCB external connector 1810 connects the image capture device package 1800 to its host device. Mechanical contacts 1890a-1890b are shown on each of first lens carriage 1840 and second lens carriage 1850.

Figure 18B:
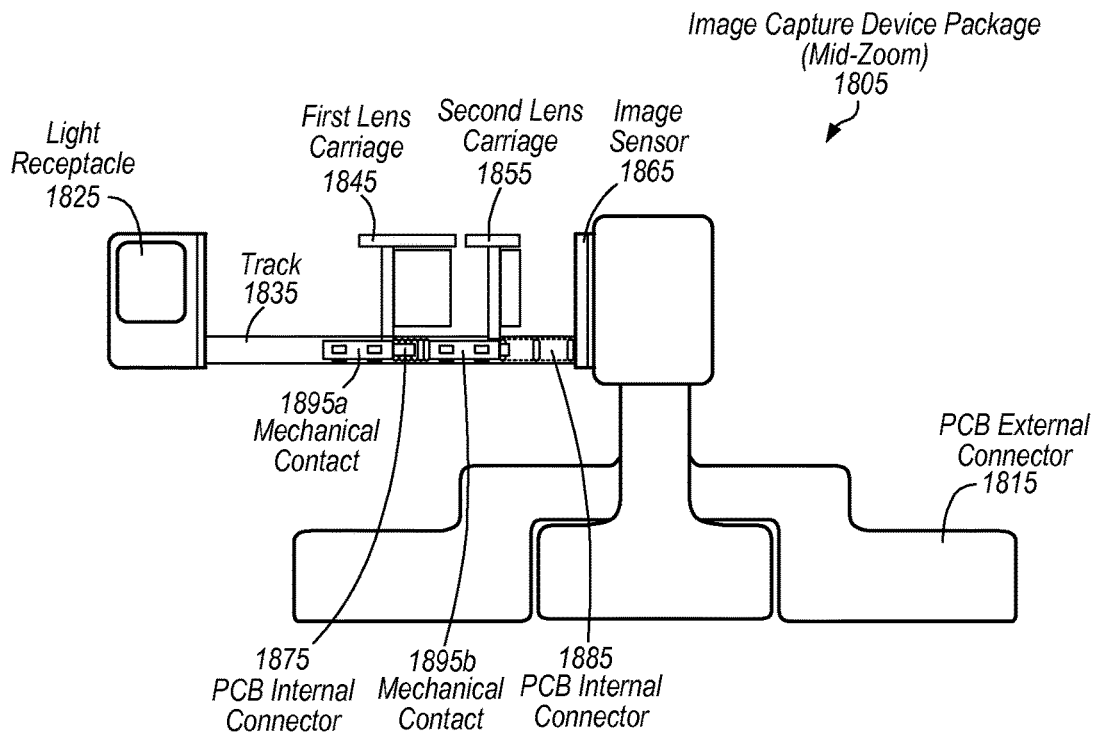

FIG. 18B illustrates a perspective view of components of a camera module according to one embodiment. An image capture device package 1805 is shown with first lens carriage 1845 and second lens carriage 1855 spaced for mid-zoom photography on a track 1835 between a light receptacle 1825 and an image sensor 1865. FPC internal connectors 1875 and 1885 connect first lens carriage 1845 and second lens carriage 1855, respectively, to control signals. PCB external connector 1815 connects the image capture device package 1805 to its host device. Mechanical contacts 1895a-1895b are shown on each of first lens carriage 1845 and second lens carriage 1855.

Figure 19:
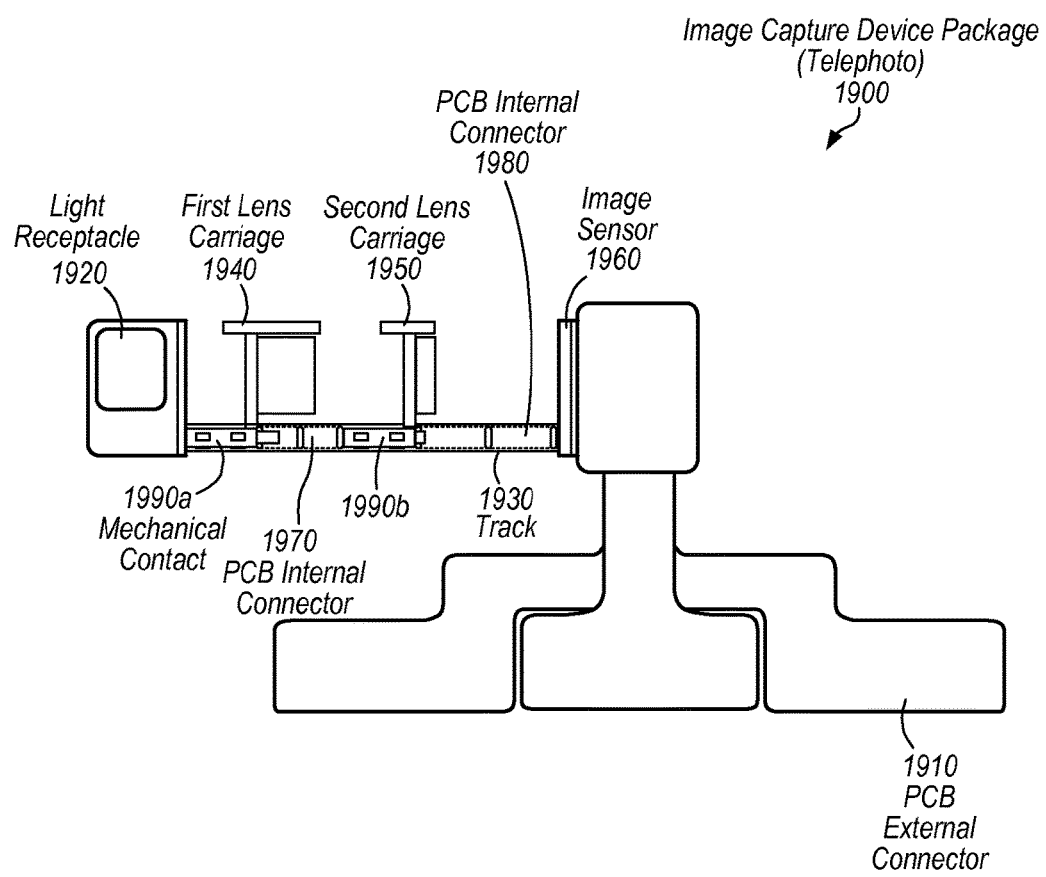
FIG. 19 shows a perspective view of components of a camera module according to one embodiment.

FIG. 19 shows a perspective view of components of a camera module according to one embodiment. An image capture device package 1900 is shown with first lens carriage 1940 and second lens carriage 1950 spaced for telephoto photography on a track 1930 between a light receptacle 1920 and an image sensor 1960. FPC internal connectors 1970 and 1980 connect first lens carriage 1940 and second lens carriage 1950, respectively, to control signals. PCB external connector 1910 connects the image capture device package 1900 to its host device. Mechanical contacts 1990a-1990b are shown on each of first lens carriage 1940 and second lens carriage 1950.

Figure 20:
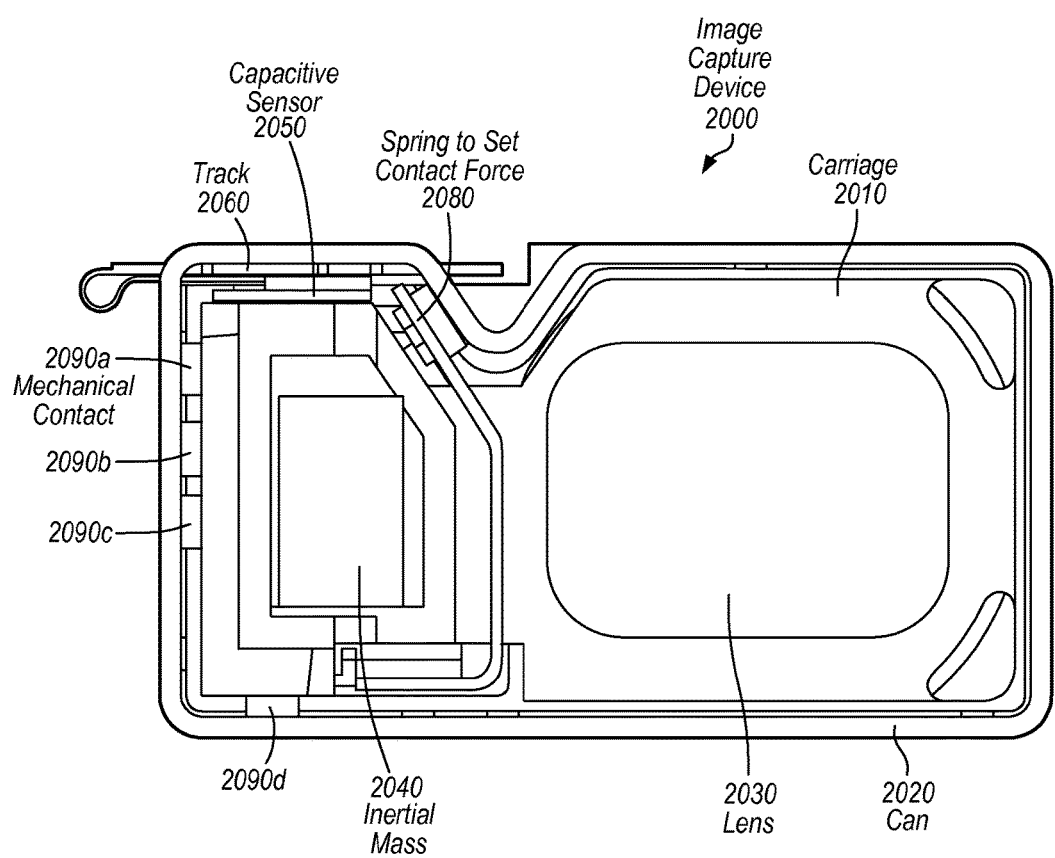
FIG. 20 shows a plan view of components of a zoom lens and actuator assembly of a camera module according to one embodiment.

FIG. 20 shows a plan view of components of a zoom lens and actuator assembly of a camera module according to one embodiment. An image capture device 2000 is shown with a lens carriage 2010 on a track 2060, a position with respect to which can be detected with a capacitive sensor 2050. A lens 2030 is shown in lens carriage 2010, as is an inertial mass 2040. Mechanical contacts 2090a-2090d are shown in contact with can 2020, and are held in place with a spring to set contact force 2080. Mechanical contacts 2090a-2090d are contact points where lens carriage 2010 contacts the surfaces of the fixed support structure, which is the can 2020 surrounding the assembly. Note that spring 2080 is integral to the lens carriage 2010, which is deformed during assembly to generate the contact forces, and hence the friction. The piezo actuator (not visible) and the inertial mass 2040 are mounted on lens carriage 2010.

Figure 21:
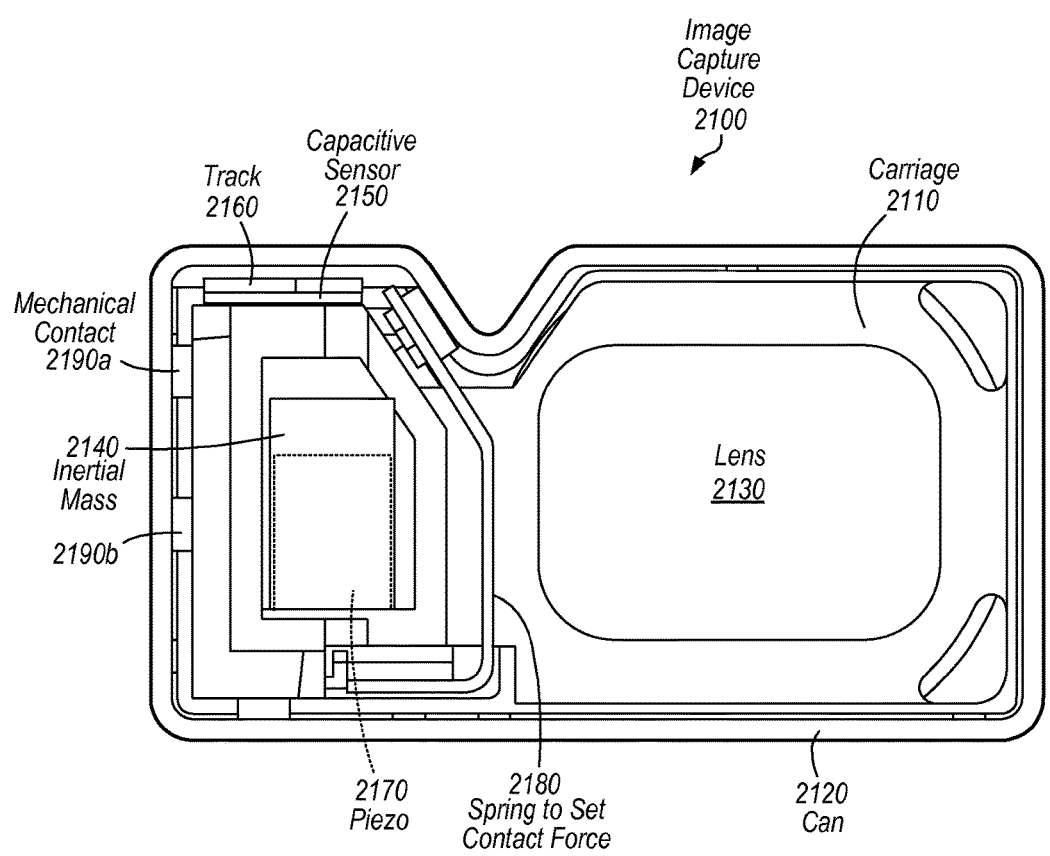
FIG. 21 shows a perspective view of components of a zoom lens and actuator assembly of a camera module according to one embodiment.

FIG. 21 shows a perspective view of components of a zoom lens and actuator assembly of a camera module according to one embodiment. An image capture device 2100 is shown with a lens carriage 2110 on a track 2160, a position with respect to which can be detected with a capacitive sensor 2150. A lens 2130 is shown in lens carriage 2110, as are an inertial mass 2140 and a piezo 2170. Mechanical contacts 2190a-2190b are shown in contact with can 2120, and are held in place with a spring to set contact force 2180.

Can 2120 provides a fixed support structure that includes surfaces to guide the carriages 2110 along the degree of freedom of interest, which in the case of the zoom actuator is parallel to the optical axis. Carriage carries a spring structure (spring to set contact force 2180), to provide an appropriate normal preload force on all the contact surfaces between the carriage 2110 and chassis (can 2120). In this way there is a friction force between the carriage 2110 and chassis (can 2120). The size of the piezo 2170 and inertial mass 2140 are chosen such that the inertial acceleration forces can overcome the static friction.

If driven with a sine wave, which is symmetric, then in the nominal case over time, there will be no net movement. However if the oscillatory waveform is asymmetric, then it can be arranged that in one direction, the inertial forces can overcome the static friction, whilst in the other direction, they are essentially lower and in the ideal case are lower than the static friction and hence there is no reverse motion. In this way, over multiple cycles, the carriage can work its way along the tracks of the fixed support structure (can 2120).

Figure 22:
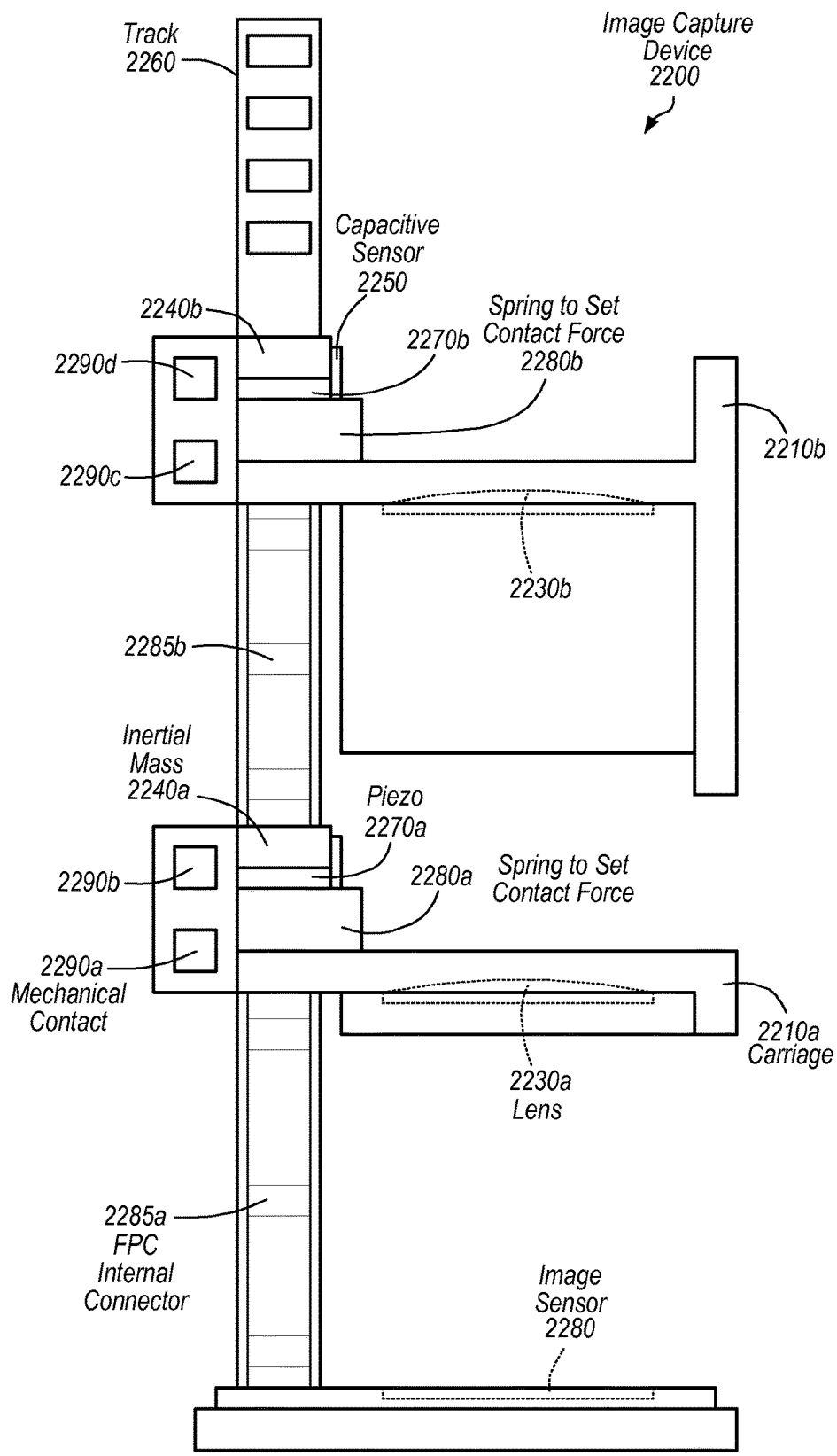
FIG. 22 shows a perspective view of components of a zoom lens and actuator assembly of a camera module according to one embodiment.

FIG. 22 shows a perspective view of components of a zoom lens and actuator assembly of a camera module according to one embodiment. An image capture device 2200 is shown with lens carriages 2210a-b on a track 2260 between an image sensor light receptacle (not shown) and an image sensor 2280. FPC internal connectors 2285a-b connect carriages 2210a-b, respectively, to control signals. Mechanical contacts 2290a-d are shown on each of lens carriages carriages 2210a-b. A capacitive sensor is present on each of lens carriages 2210a-b but is only clearly visible on lens carriage 2210b as capacitive sensor 2250. Lens carriages 2210a-b carry inertial masses 2240a-b and piezos 2270a-b as well as lenses 2230a-b and springs to set contact force 2280a-b.

Lens carriages 2210a-b are moveable carriages that slide along surfaces of a fixed support structure, e.g. track 2260 or internal surfaces of cover 676 of FIG. 6, such that the contact surfaces between the carriages 2210a-b and the fixed support structure collectively substantially constrain up to five degrees of freedom of motion of carriages 2210a-b, and the remaining sixth degree of freedom represents linear motion of carriages 2210a-b along an axis relative to the fixed support structure, which axis is also the optical axis of lenses 2230a-2230b. In some embodiments, the motion is limited by friction between carriages 2210a-b and the fixed support structure.

In some embodiments the contact forces that generate the friction forces are themselves generated by springs to set contact forces 2280a-2280b of the carriages 2210a-b that contacts a further surface of the fixed support structure. In some embodiments, the motion of carriages 2210a-b relative to the fixed support structure is controlled by the operation of piezos 2270a-b mounted on carriages 2210a-b, which includes linear actuator with direction of motion parallel to the movement axis, fixed at one end to the carriages 2210a-b and at the other inertial masses 2240a-b. In some embodiments, separate electrical connection means in the form of FPC internal connections 2285a-b is provided to the moveable carriage to electrically drive the piezos 2270a-b as appropriate to generate the desired motion.

In some embodiments, the piezos 2270a-b driven with an asymmetric oscillatory electrical signal so that in one part of the cycle the inertial acceleration of the carriages 2210a-b is higher than in another, and during at least a portion of the oscillatory motion, the inertial forces exceed the static friction of the frictional contacts between the carriages 2210a-b and the fixed support structure and cause sliding in the allowed linear degree of freedom. In combination, multiple such oscillatory cycles yield a net motion of the carriages 2210a-b in one direction relative to the fixed support structure, and wherein the reverse motion can be achieved by appropriately altering the asymmetric electrical signal.

In some embodiments, carriages 2210a-b are used to move one or more lenses 2230a-b of a miniature camera, such that the axis of motion of the carriages 2210a-b are parallel to the optical axis of the one or more lenses 2230a-b. In some embodiments, the piezos are linear actuators 2270a-b attached to inertial masses 2240a-b.

In some embodiments, capacitive position sensors (e.g. 2250) detect the capacitance between an electrode mounted on carriages 2210a-b, and a patterned electrode mounted on the fixed support structure in such a way that the capacitance varies depending on the position of the carriages 2210a-b. In some embodiments, the electrode pattern forms an oscillatory pattern along the direction of motion, such that the measured capacitance oscillates as the carriages 2210a-b move along the axis of motion in a given direction, so that a coarse measure of position from a given home position is determined by counting the number of oscillatory cycles, whilst a fine measure of position is determined by the actual measured capacitance within one oscillatory cycle of capacitance.

Figure 23:
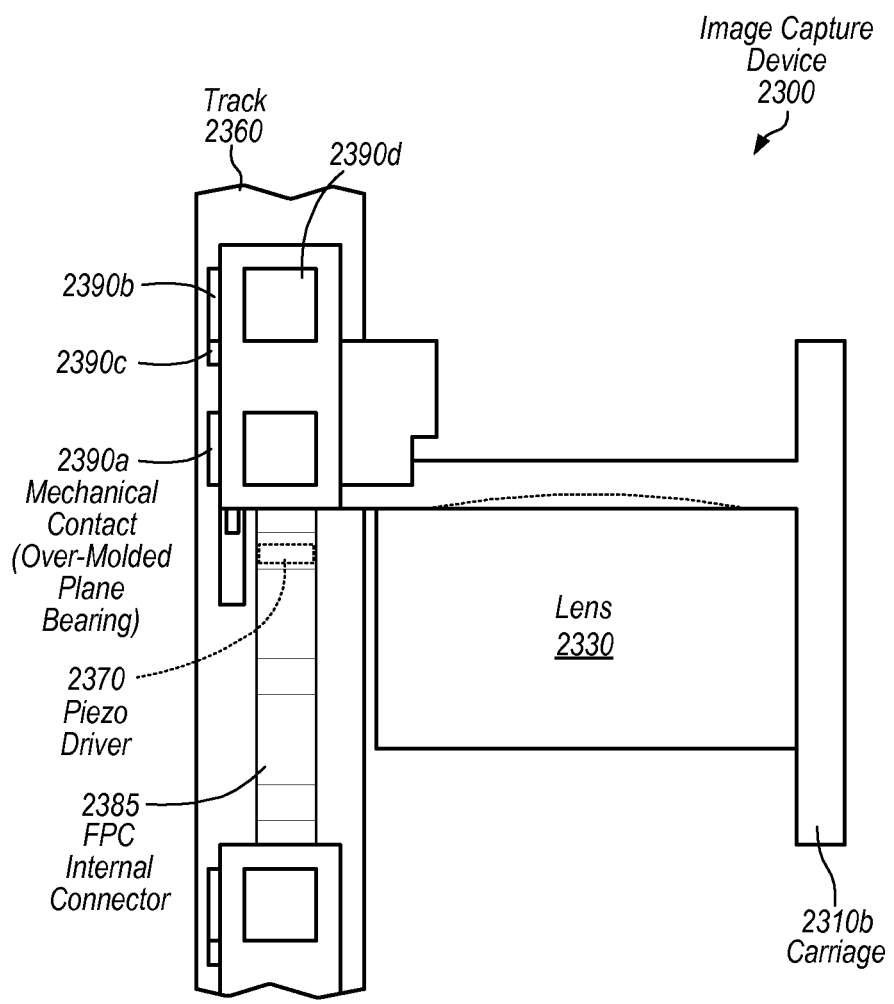
FIG. 23 shows a perspective view of components of a zoom lens and actuator assembly of a camera module according to one embodiment.

This configuration delivers electrical signals to piezos 2170a-b on the carriages 2210a-b by routing electrical connections through a flexible printed circuit (FPC) in the form of FPC internal connections 2285a-b folded in a zig-zap pattern to accommodate the relatively large displacements required. If the actuator driver IC is mounted on the moving carriage (as shown in FIG. 23), this minimizes the electrical complexity of routing signals to carriages 2210a-b, as only four terminals are required; two power terminals (typically a power supply track and a ground track) and two communication terminals (typically I2C clock and data lines). This is particularly useful for the configuration where there are plural carriages 2210a-b running independently on the same guide surfaces of the fixed support structure, as the same four connections can be routed to each moving body.

FIG. 23 shows a perspective view of components of a zoom lens and actuator assembly of a camera module according to one embodiment. An image capture device 2300 is shown with lens carriages 2310a-b on a track 2360 between an image sensor light receptacle (not shown) and an image sensor (not shown). A FPC internal connectors 2385 (only one shown) connect carriages 2310a-b, respectively, to control signals. Mechanical contacts (over-moulded plane bearings) 2390a-g are shown on each of lens carriages 2310a-b. Lens carriage 2310b visibly carries inertial masses 2240a-b, a piezo driver 2370 as well as lens 2330 and a spring to set contact force 2380.

In some embodiments, a programmable driver circuit 2370 for the inertial actuator is also mounted on the moveable carriage 2310b, and at least four electrical signals are supplied to the moveable carriage 2310b, two being electrical power terminals and two being communication terminals to command a desired motion. In some embodiments, plural such moveable carriages and inertial actuators operate independently along the same guide surfaces of the fixed support structure.

In some embodiments, FPC internal connector 2385 is only one FPC for the whole assembly to minimize electrical connectivity (although this is not a necessity). However note that FPC internal connector 2385 is considerably folded. In some embodiments, track 2360 is a straight vertical portion of the FPC that is fixed to the fixed support structure. In some embodiments, FPC internal connector 2385 also routes and required electrical connections to the mirror and lens assembly (lens and mirror assembly 1725 of FIG. 17B). In addition, FPC internal connector 2385 includes a patterned electrode along its length (track 2360) that is used in conjunction with electrodes on proximate portions of the FPC joined to moveable carriage 2310b that together form a capacitor. As moveable carriage 2310b moves along the optical axis relative to the fixed support structure, the area of overlapping electrodes in the vertical portion of the FPC FPC on track 2360 and on moveable carriage 2310b changes. The capacitance can be measured by the piezo driver 2370, and this can be used to assess the position of moveable carriage 2310b, and hence acts as a position sensor.

Figure 24A:
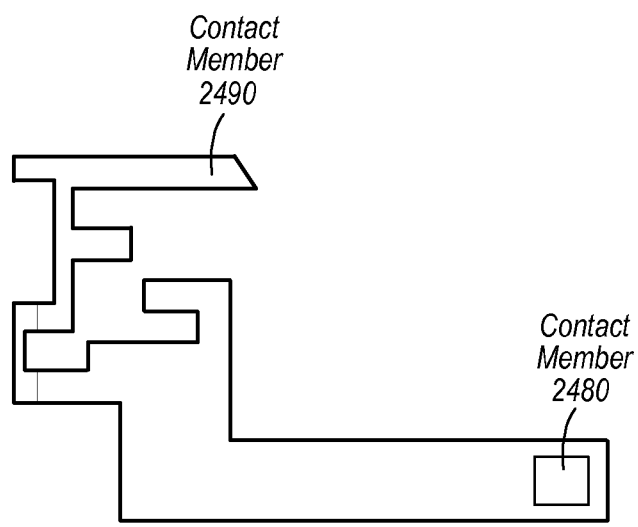
FIG. 24A shows a perspective view of a metal contact component of a zoom lens and actuator assembly of a camera module according to one embodiment.

FIG. 24A shows a perspective view of a metal contact component of a zoom lens and actuator assembly of a camera module according to one embodiment. Contact members 2480 and 2490 (also called a carriage insert) is shown. Contact members 2480 and 2490 start the fabrication process as a single component in the fabrication process and is broken into separate components as fabrication continues.

Figure 24B:
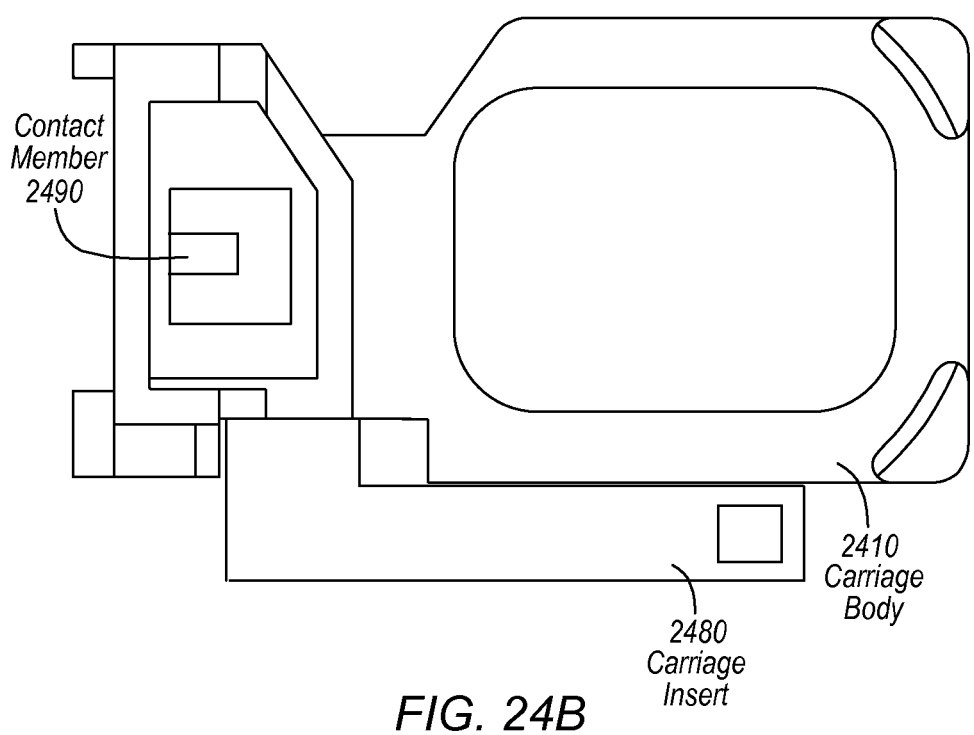
FIG. 24B shows a perspective view of articulation of a metal contact component of a zoom lens and actuator assembly of a camera module according to one embodiment.

FIG. 24B shows a perspective view of articulation of a metal contact component of a zoom lens and actuator assembly of a camera module according to one embodiment. A contact members 2480 and 2490 (also called a carriage insert) and a carriage body 2410 are shown.

Figure 25A:
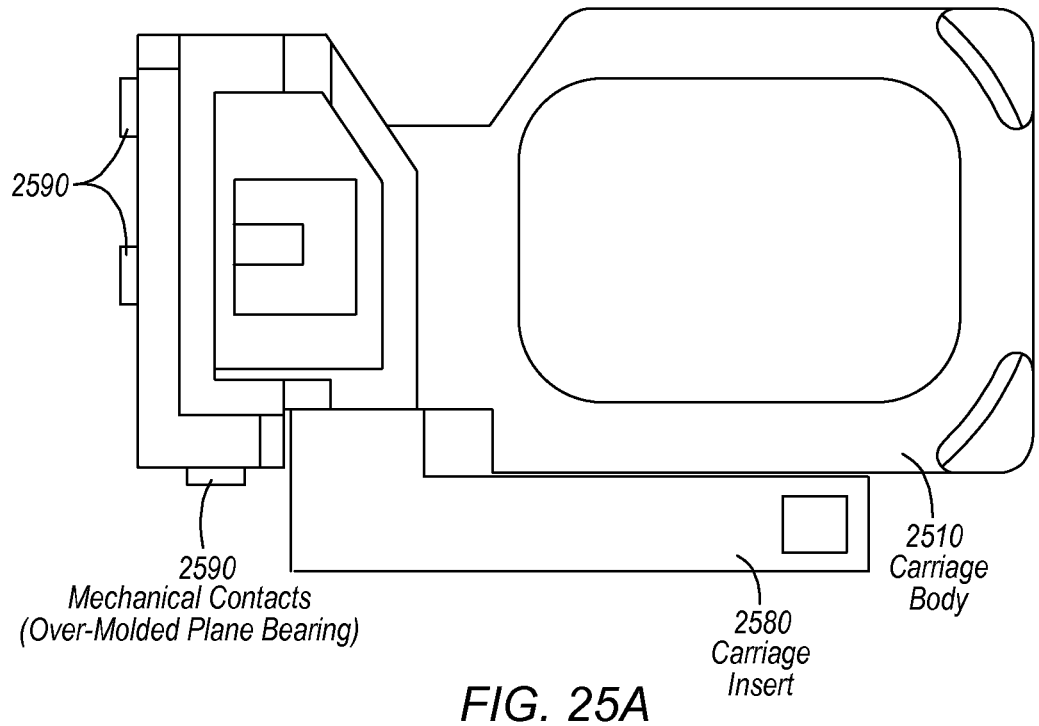
FIG. 25A shows a perspective view of articulation of components of a zoom lens and actuator assembly of a camera module according to one embodiment.

FIG. 25A shows a perspective view of articulation of components of a zoom lens and actuator assembly of a camera module according to one embodiment. A contact member 2580 (also called a carriage insert) and a carriage body 2510 are shown. Mechanical contacts (over-moulded plane bearings) 2590 are shown. The insert serves two purposes: The first is to route the electrical connections from the piezo (not shown) to the terminals that are to be soldered to the FPC (not shown); the second is to form the spring (spring set to contact force 2570 of FIG. 25B) that is subsequently bent up and deformed during assembly into the fixed support structure (Can—not shown) to generate the contact loads and hence the friction. The main structure of the carriage body 2510 is then over-molded around this metal insert (shown in the second view of FIG. 8).

Figure 25B:
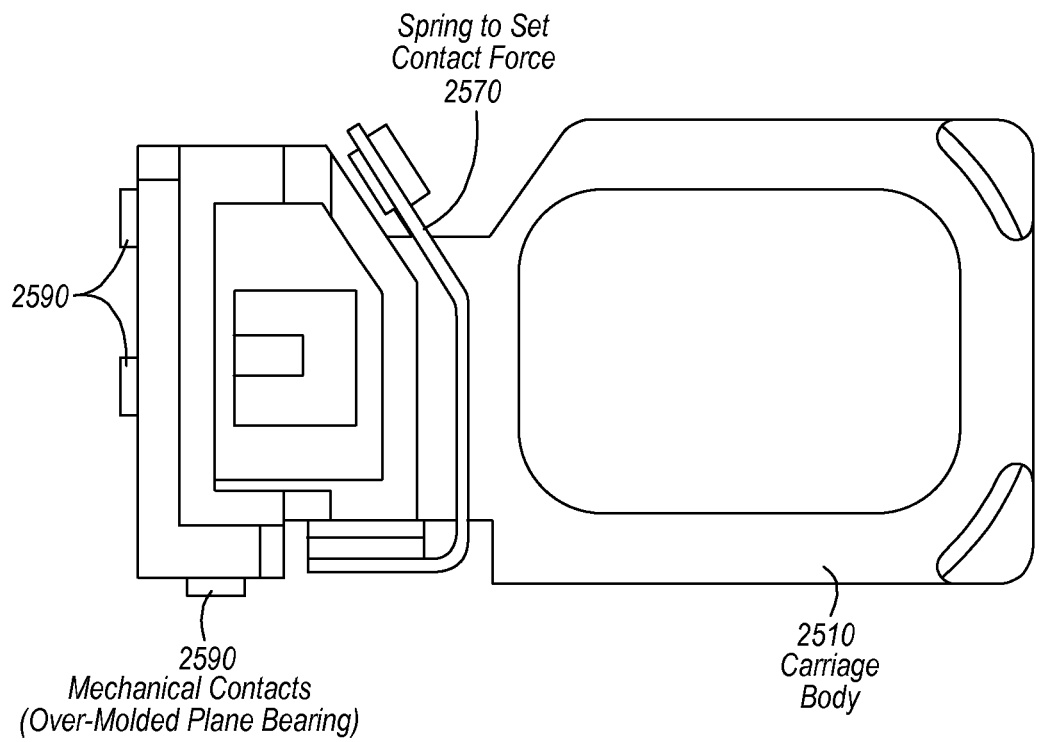
FIG. 25B shows a perspective view of articulation of components of a zoom lens and actuator assembly of a camera module according to one embodiment.

FIG. 25B shows a perspective view of articulation of components of a zoom lens and actuator assembly of a camera module according to one embodiment. A contact member 2580 (also called a carriage insert) and a carriage body 2510 are shown. Mechanical contacts (over-moulded plane bearings) 2590 are shown, as is a spring to set contact force 2570.

Figure 26A:
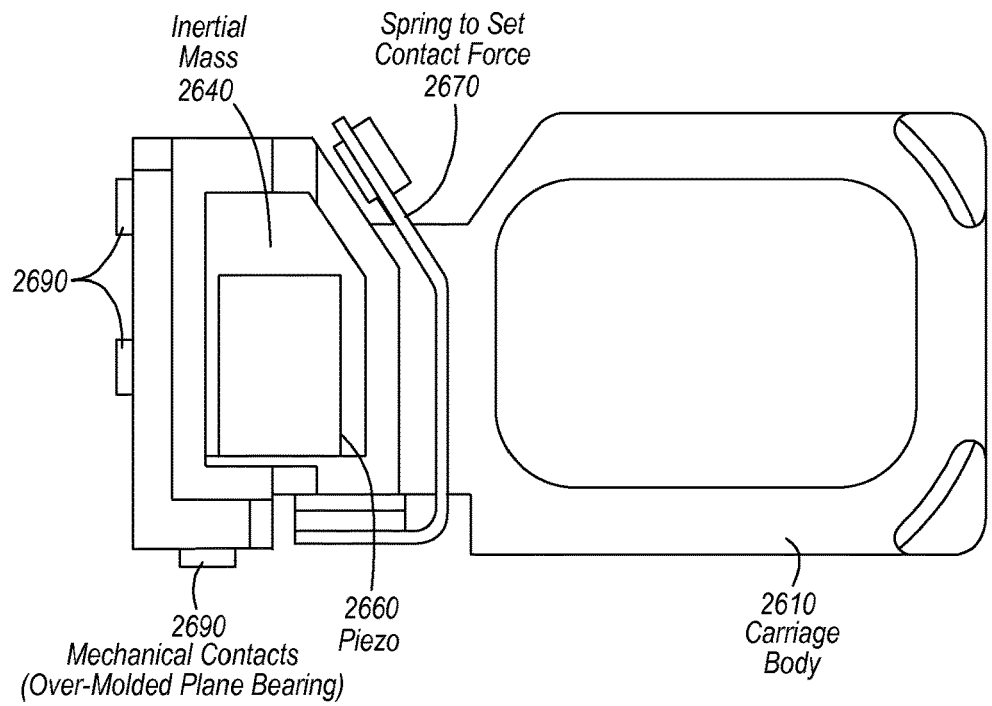
FIG. 26A shows a perspective view of articulation of components of a zoom lens and actuator assembly of a camera module according to one embodiment.

FIG. 26A shows a perspective view of articulation of components of a zoom lens and actuator assembly of a camera module according to one embodiment. A carriage body 2610 and a piezo 2660 are shown. Mechanical contacts (over-moulded plane bearings) 2690 are shown, as is a spring to set contact force 2670. The contact points (over-moulded plane bearings 2690) are added by molding a further shot of polymer onto the carriage body 2610. Bearing material for over-moulded plane bearings 2690 is chosen to minimize wear and friction coefficient between the moving carriage and the fixed support structure.

Figure 26B:
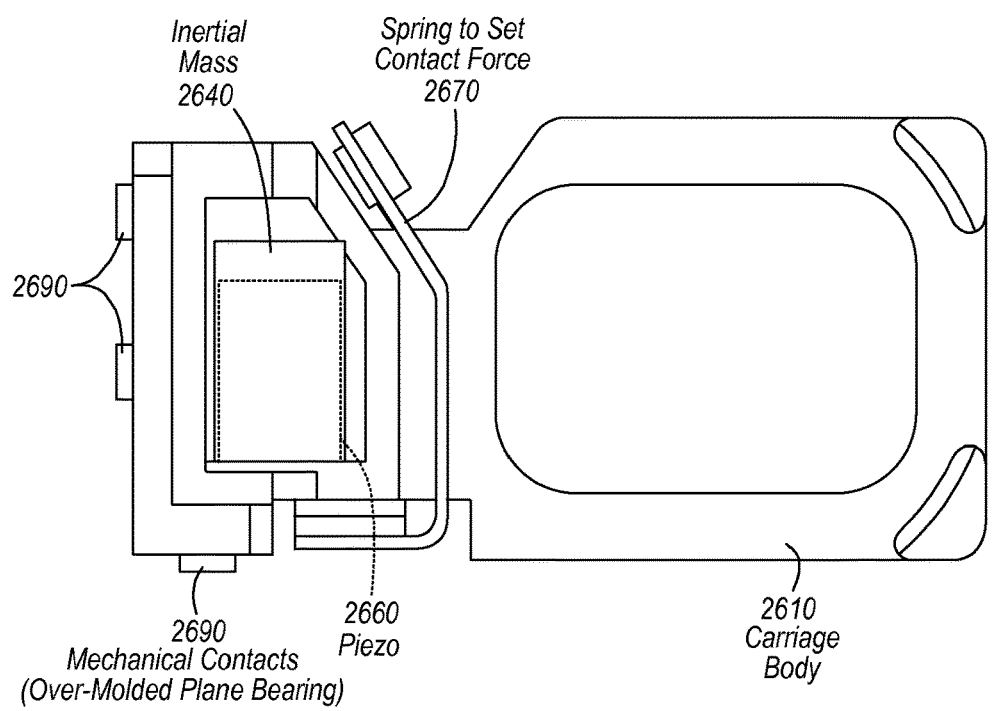
FIG. 26B shows a perspective view of articulation of components of a zoom lens and actuator assembly of a camera module according to one embodiment.

FIG. 26B shows a perspective view of articulation of components of a zoom lens and actuator assembly of a camera module according to one embodiment. A carriage body 2610, an inertial mass 2640 and a piezo 2660 are shown. Mechanical contacts (over-moulded plane bearings) 2690 are shown, as is a spring to set contact force 2670.

Figure 27:
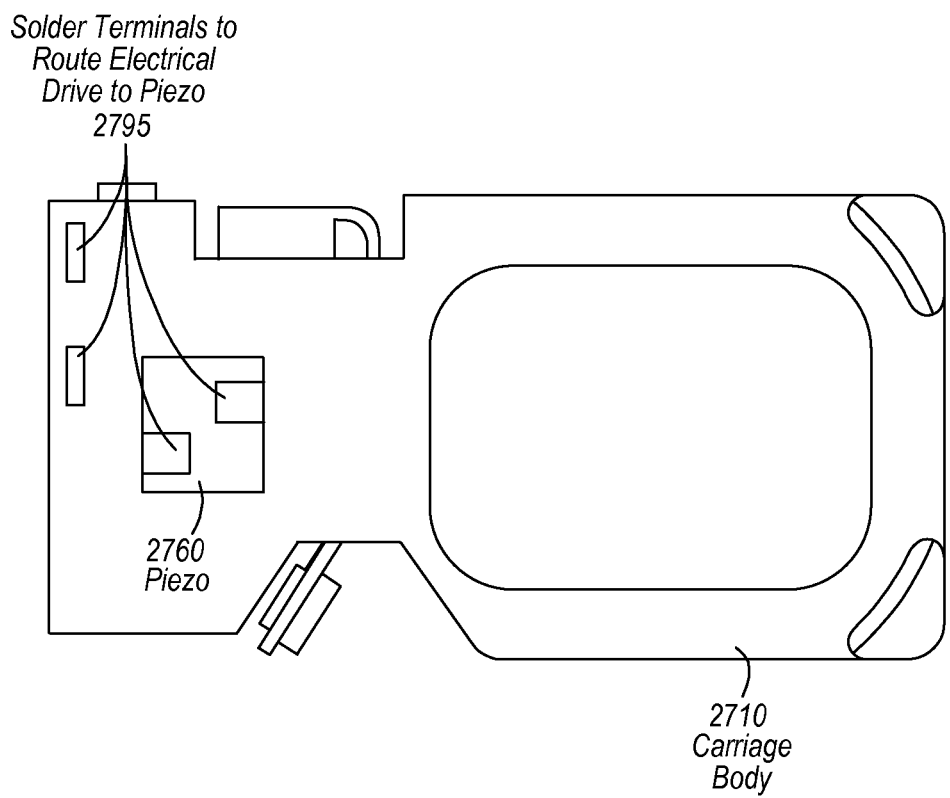
FIG. 27 shows a perspective view of articulation of components of a zoom lens and actuator assembly of a camera module according to one embodiment.

FIG. 27 shows a perspective view of articulation of components of a zoom lens and actuator assembly of a camera module according to one embodiment. A carriage body 2710, and a piezo 2760 are shown. A spring to set contact force 2770 and solder terminals to route electrical drive to the piezo 2795 are shown. Piezo 2760 is first soldered from the underside to the solder terminals to route electrical drive to the piezo 2795 visible in the hole through the carriage body 2710. Next adhesive, and/or potting compound are injected into the hole to flow around the underside of the piezo 2760 and bond it to the carriage body 2710, also potting the electrical connections and filling the hole in the moving carriage to add to its stiffness.

Example Computer System

Figure 28:
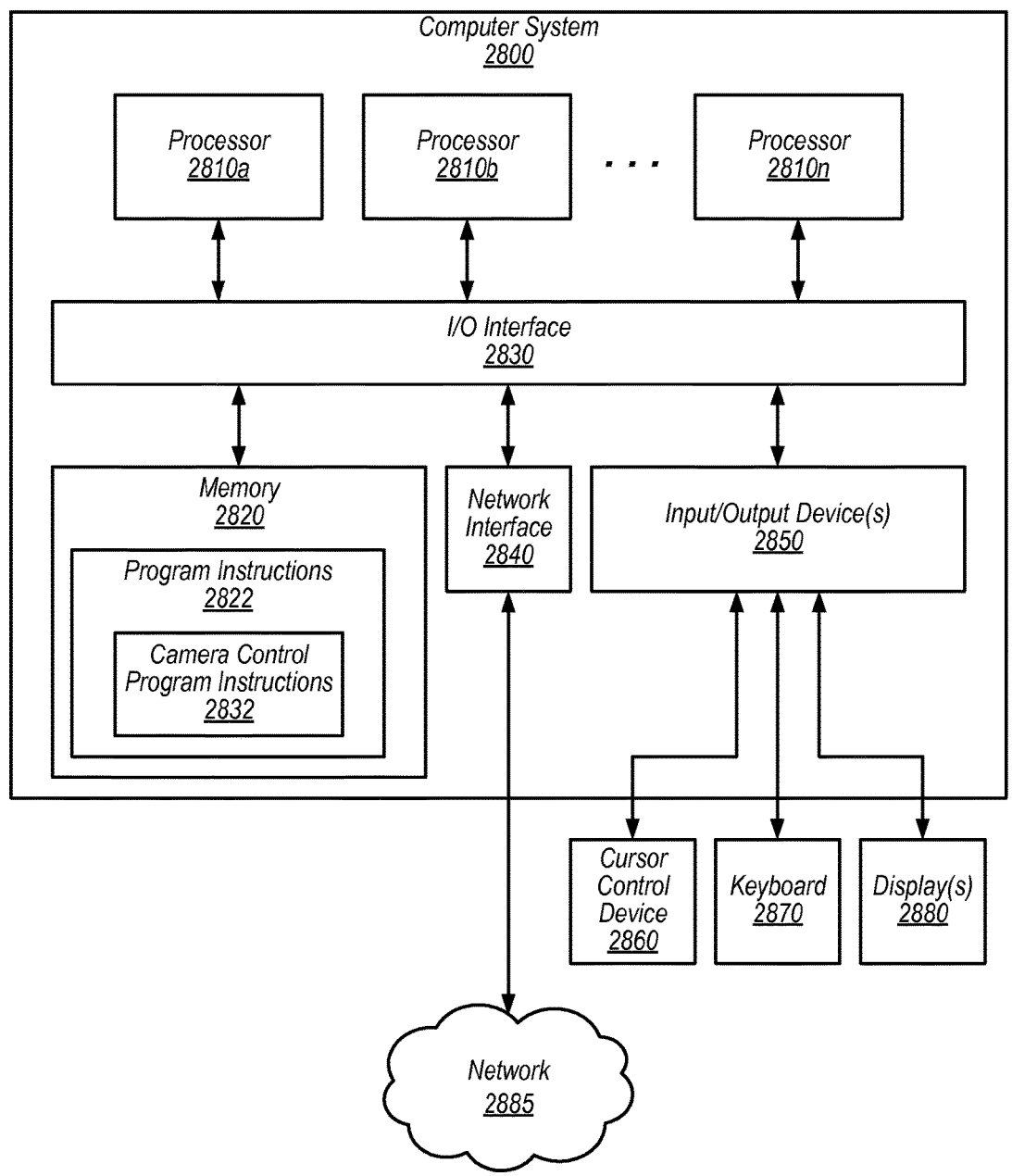
FIG. 28 illustrates an example computer system configured to implement aspects of the system and method for camera control, according to some embodiments.

FIG. 28 illustrates computer system 2800 that is configured to execute any or all of the embodiments described above. In different embodiments, computer system 2800 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion system as described herein, may be executed in one or more computer systems 2800, which may interact with various other devices. Note that any component, action, or functionality described above with respect to FIGS. 1-20 may be implemented on one or more computers configured as computer system 2800 of FIG. 28, according to various embodiments. In the illustrated embodiment, computer system 2800 includes one or more processors 2810 coupled to a system memory 2820 via an input/output (I/O) (I/O) interface 2830. Computer system 2800 further includes a network interface 2840 coupled to I/O interface 2830, and one or more input/output devices 2850, such as cursor control device 2860, keyboard 2870, and display(s) 2880. In some cases, it is contemplated that embodiments may be implemented using a single instance of computer system 2800, while in other embodiments multiple such systems, or multiple nodes making up computer system 2800, may be configured to host different portions or instances of embodiments. For example, in one embodiment some elements may be implemented via one or more nodes of computer system 2800 2800 that are distinct from those nodes implementing other elements.

In various embodiments, computer system 2800 may be a uniprocessor system including one processor 2810, or a multiprocessor system including several processors 2810 (e.g., two, four, eight, or another suitable number). Processors 2810 may be any suitable processor capable of executing instructions. For example, in various embodiments processors 2810 may be general-purpose or embedded processors implementing any of a variety of instruction set architectures (ISAs), such as the x86, PowerPC, SPARC, or MIPS ISAs, or any other suitable ISA. In multiprocessor systems, each of processors 2810 may commonly, but not necessarily, implement the same ISA.

System memory 2820 may be configured to store camera control program instructions 2822 and/or camera control data accessible by processor 2810. In various embodiments, system memory 2820 may be implemented using any suitable memory technology, such as static random access memory (SRAM), synchronous dynamic RAM (SDRAM), nonvolatile/Flash-type memory, or any other type of memory. In the illustrated embodiment, program instructions 2822 may be configured to implement a lens control application 2824 incorporating any of the functionality described above. Additionally, existing camera control data 2832 of memory 2820 may include any of the information or data structures described above. In some embodiments, program instructions and/or data may be received, sent or stored upon different types of computer-accessible media or on similar media separate from system memory 2820 or computer system 2800. While computer system 2800 is described as implementing the functionality of functional blocks of previous Figures, any of the functionality described herein may be implemented via such a computer system.

In one embodiment, I/O interface 2830 may be configured to coordinate I/O traffic traffic between processor 2810, system memory 2820, and any peripheral devices in the device, including network interface 2840 or other peripheral interfaces, such as input/output devices 2850. In some embodiments, I/O interface 2830 may perform any necessary protocol, timing or other data transformations to convert data signals from one component (e.g., system memory 2820) into a format suitable for use by another component (e.g., processor 2810). In some embodiments, I/O interface 2830 may include support for devices attached through various types of peripheral buses, such as a variant of the Peripheral Component Interconnect (PCI) bus standard or the Universal Serial Bus (USB) standard, for example. In some embodiments, the function of I/O interface 2830 may be split into two or more separate components, such as a north north bridge and a south bridge, for example. Also, in some embodiments some or all of the functionality of I/O interface 2830, such as an interface to system memory 2820, may be incorporated directly into processor 2810.

Network interface 2840 may be configured to allow data to be exchanged between computer system 2800 and other devices attached to a network 2885 (e.g., carrier or agent devices) or between nodes of computer system 2800. Network 2885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2850 may, in some embodiments, include one or more display terminals, keyboards, keypads, touchpads, scanning devices, voice or optical recognition devices, or any other devices suitable for entering or accessing data by one or more computer systems 2800. Multiple input/output devices 2850 may be present in computer system 2800 or may be distributed on various nodes of computer system 2800. In some embodiments, similar input/output devices may be separate from computer system 2800 and may interact with one or more nodes of computer system 2800 through a wired or wireless connection, such as over network interface 2840.

As shown in FIG. 28, memory 2820 may include program instructions 2822, which may be processor-executable to implement any element or action described above. In one embodiment, the program instructions may implement the methods described above. In other embodiments, different elements and data may be included. Note that data may include any data or information described above.

Those skilled in the art will appreciate that computer system 2800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2800 may be transmitted to computer system 2800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Example Embodiments

Further examples of specific feature combination taught within the present disclosure are set out in the following numbered examples:

Clause 1. A system, comprising:
   a fixed chassis structure; and
   a moveable carriage body, wherein
      the moveable carriage body carries one or more lenses,
      the moveable carriage body is movably mounted to the chassis structure so as to limit a plurality of degrees of freedom of movement of the moveable carriage body but to allow movement along an optical axis through the one or more lenses,
      an inertial actuator is mounted to the moveable carriage body in an alignment such that the axis of motion of the actuator is parallel to at least one allowed degree of freedom,
      the moveable carriage body is held in place with respect to the at least one allowed degree of freedom by one or more friction forces received at one or more mechanical contacts with the chassis structure,
      the inertial actuator is actionable to overcome the friction forces, and
      an inertial mass is mounted to the inertial actuator on a side opposite the carriage body.
Clause 2. The system of clause 1, wherein the moveable carriage body receives power and control signals to the inertial actuator through a flexible printed circuit.
Clause 3. The system of any of clauses 1-2, further comprising:
   a driver circuit mounted on the moveable carriage body, wherein
   the moveable carriage body receives power and control signals for the driver circuit to the inertial actuator through a flexible printed circuit.
Clause 4. The system of any of clauses 1-3, further comprising:
   a driver circuit mounted on the moveable carriage body, and
   a position sensor, mounted on the moveable carriage body, for determining a position of the moveable carriage body, wherein
      the position sensor is connected to the driver circuit for reporting position information to the driver circuit.
Clause 5. The system of any of clauses 1-4, wherein the inertial actuator comprises a piezoelectric actuator.
Clause 6. The system of any of clauses 1-5, wherein
   the moveable carriage body contacts the chassis along multiple conductive tracks for transmitting power and control signals to the inertial actuator, and
   the system further comprises a spring mounted to the moveable carriage body to generate a contact force at the one or more conductive tracks so as to generate a friction force between the moveable carriage body and the multiple conductive tracks.
Clause 7. The system of any of clauses 1-6, further comprising:
   a driver circuit mounted on the moveable carriage body, and
   a capacitive position sensor, mounted on the moveable carriage body, for determining a position of the moveable carriage body based on a plate capacitance between a plate of the position sensor and a metal pattern track on the chassis.
Clause 8. A method, the method comprising:
   applying a first voltage to an inertial actuator attached to a moveable lens carriage body, wherein
      the inertial actuator is a piezoelectric element, and
      the first voltage causes an expansion of the piezoelectric element; and
   applying a second voltage to the inertial actuator attached to a moveable lens carriage body, wherein
      the second voltage causes a contraction of the piezoelectric element, and
      the contraction is slower than the expansion.
Clause 9. The method of clause 8, further comprising:
   applying a third voltage to an inertial actuator attached to a moveable lens carriage body, wherein
      the third voltage causes a contraction of the piezoelectric element; and
   applying a fourth voltage to the inertial actuator attached to a moveable lens carriage body, wherein
      the fourth voltage causes an expansion of the piezoelectric element, and
      the expansion is slower than the contraction.
Clause 10. The method of any of clauses 8-9, further comprising:
   measuring a position of the moveable lens carriage body using a capacitive sensor attached to the moveable lens carriage body.
Clause 11. The method of any of clauses 8-10, wherein the applying a first voltage and the applying a second voltage further comprise driving an inertial actuator attached to the moveable lens carriage body with an asymmetric oscillatory electrical signal so that in one half of the cycle the inertial acceleration is higher than in the other.
Clause 12. The method of any of clauses 8-11, wherein the applying a first voltage and the applying a second voltage further comprise driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and the chassis structure to cause sliding in an allowed linear degree of freedom.
Clause 13. The method of any of clauses 8-12, wherein the applying a first voltage and the applying a second voltage further comprise driving an inertial actuator attached to the moveable lens carriage body with an asymmetric oscillatory electrical signal having a sawtooth waveform.

Clause 14. The method of any of clauses 8-13, further comprising:
driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

Clause 15. A non-transitory computer-readable storage medium storing program instructions, wherein the program instructions are computer-executable to implement:
applying a first voltage to an inertial actuator attached to a moveable lens carriage body, wherein
the inertial actuator is a piezoelectric element, and
the first voltage causes an expansion of the piezoelectric element; and
applying a second voltage to the inertial actuator attached to a moveable lens carriage body, wherein
the second voltage causes a contraction of the piezoelectric element, and
the contraction is slower than the expansion.

Clause 16. The non-transitory computer-readable storage medium of clause 15, further comprising:
program instructions computer-executable to implement applying a third voltage to an inertial actuator attached to a moveable lens carriage body, wherein
the third voltage causes a contraction of the piezoelectric element; and
program instructions computer-executable to implement applying a fourth voltage to the inertial actuator attached to a moveable lens carriage body, wherein
the fourth voltage causes an expansion of the piezoelectric element, and
the expansion is slower than the contraction.

Clause 17. The non-transitory computer-readable storage medium of any of clauses 15-16, further comprising:
program instructions computer-executable to implement measuring a position of the moveable lens carriage body using a capacitive sensor attached to the moveable lens carriage body.

Clause 18. The non-transitory computer-readable storage medium of any of clauses 15-17, wherein the program instructions computer-executable to implement applying a first voltage and the applying a second voltage further comprise program instructions computer-executable to implement driving an inertial actuator attached to the moveable lens carriage body with an asymmetric oscillatory electrical signal so that in one half of the cycle the inertial acceleration is higher than in the other.

Clause 19. The non-transitory computer-readable storage medium of any of clauses 15-18, wherein the program instructions computer-executable to implement applying a first voltage and the applying a second voltage further comprise program instructions computer-executable to implement driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and the chassis structure to cause sliding in an allowed linear degree of freedom.

Clause 20. The non-transitory computer-readable storage medium of any of clauses 15-19, wherein the program instructions computer-executable to implement applying a first voltage and the applying a second voltage further comprise program instructions computer-executable to implement driving an inertial actuator attached to the moveable lens carriage body with an asymmetric oscillatory electrical signal having a sawtooth waveform.

What is claimed is:

1. A system, comprising:
a fixed chassis structure; and
a moveable carriage body, wherein
the moveable carriage body carries one or more lenses,
the moveable carriage body is movably mounted to the chassis structure so as to limit a plurality of degrees of freedom of movement of the moveable carriage body but to allow movement along an optical axis through the one or more lenses,
an inertial actuator is mounted to the moveable carriage body in an alignment to move along the optical axis with the moveable carriage body,
the moveable carriage body is held in place with respect to the at least one allowed degree of freedom by one or more friction forces received at one or more mechanical contacts with the chassis structure,
the inertial actuator is actionable to overcome the friction forces, and
an inertial mass is mounted to the inertial actuator on a side opposite the carriage body.

2. The system of claim 1, wherein the moveable carriage body receives power and control signals to the inertial actuator through a flexible printed circuit.

3. The system of claim 1, further comprising:
a driver circuit mounted on the moveable carriage body, wherein
the moveable carriage body receives power and control signals for the driver circuit to the inertial actuator through a flexible printed circuit.

4. The system of claim 1, further comprising:
a driver circuit mounted on the moveable carriage body, and
a position sensor, mounted on the moveable carriage body, for determining a position of the moveable carriage body, wherein
the position sensor is connected to the driver circuit for reporting position information to the driver circuit.

5. The system of claim 1, wherein the inertial actuator comprises a piezoelectric actuator.

6. The system of claim 1, wherein
the moveable carriage body contacts the chassis along multiple conductive tracks for transmitting power and control signals to the inertial actuator, and
the system further comprises a spring mounted to the moveable carriage body to generate a contact force at the one or more conductive tracks so as to generate a friction force between the moveable carriage body and the multiple conductive tracks.

7. The system of claim 1, further comprising:
a driver circuit mounted on the moveable carriage body, and
a capacitive position sensor, mounted on the moveable carriage body, for determining a position of the moveable carriage body based on a plate capacitance between a plate of the position sensor and a metal pattern track on the chassis.

8. A method, comprising:
applying a first voltage to an inertial actuator attached to a moveable lens carriage body, wherein
the inertial actuator is attached to the moveable lens carriage body to move with the moveable lens carriage body along an optical axis defined by one or more lenses held within the moveable lens carriage body,
the inertial actuator is a piezoelectric element, and
the first voltage causes an expansion of the piezoelectric element; and
applying a second voltage to the inertial actuator attached to the moveable lens carriage body, wherein
the second voltage causes a contraction of the piezoelectric element, and
the contraction is slower than the expansion.

9. The method of claim 8, further comprising:
applying a third voltage to the inertial actuator attached to the moveable lens carriage body, wherein
the third voltage causes a contraction of the piezoelectric element; and
applying a fourth voltage to the inertial actuator attached to the moveable lens carriage body, wherein
the fourth voltage causes an expansion of the piezoelectric element, and
the expansion is slower than the contraction.

10. The method of claim 8, further comprising:
measuring a position of the moveable lens carriage body using a capacitive sensor attached to the moveable lens carriage body.

11. The method of claim 8, wherein the applying a first voltage and the applying a second voltage further comprise driving the inertial actuator attached to the moveable lens carriage body with an asymmetric oscillatory electrical signal so that in one half of the cycle the inertial acceleration is higher than in the other.

12. The method of claim 8, wherein the applying a first voltage and the applying a second voltage further comprise driving the inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and a chassis structure to cause sliding in an allowed linear degree of freedom.

13. The method of claim 8, wherein the applying a first voltage and the applying a second voltage further comprise driving the inertial actuator attached to the moveable lens carriage body with an asymmetric oscillatory electrical signal having a sawtooth waveform.

14. The method of claim 8, further comprising:
driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

15. A non-transitory computer-readable storage medium storing program instructions, wherein the program instructions are computer-executable to implement:
applying a first voltage to an inertial actuator attached to a moveable lens carriage body, wherein
the inertial actuator is attached to the moveable lens carriage body to move with the moveable lens carriage body along an optical axis defined by one or more lenses held within the moveable lens carriage body,
the inertial actuator is a piezoelectric element, and
the first voltage causes an expansion of the piezoelectric element; and
applying a second voltage to the inertial actuator attached to the moveable lens carriage body, wherein
the second voltage causes a contraction of the piezoelectric element, and
the contraction is slower than the expansion.

16. The non-transitory computer-readable storage medium of claim 15, further comprising:
program instructions computer-executable to implement applying a third voltage to the inertial actuator attached to the moveable lens carriage body, wherein
the third voltage causes a contraction of the piezoelectric element; and
program instructions computer-executable to implement applying a fourth voltage to the inertial actuator attached to the moveable lens carriage body,
wherein
the fourth voltage causes an expansion of the piezoelectric element, and
the expansion is slower than the contraction.

17. The non-transitory computer-readable storage medium of claim 15, further comprising:
program instructions computer-executable to implement measuring a position of the moveable lens carriage body using a capacitive sensor attached to the moveable lens carriage body.

18. The non-transitory computer-readable storage medium of claim 15, wherein the program instructions computer-executable to implement applying a first voltage and the applying a second voltage further comprise program instructions computer-executable to implement driving the inertial actuator attached to the moveable lens carriage body with an asymmetric oscillatory electrical signal so that in one half of the cycle the inertial acceleration is higher than in the other.

19. The non-transitory computer-readable storage medium of claim 15, wherein the program instructions computer-executable to implement applying a first voltage and the applying a second voltage further comprise program instructions computer-executable to implement driving the inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and a chassis a structure to cause sliding in an allowed linear degree of freedom.

20. The non-transitory computer-readable storage medium of claim 15, wherein the program instructions computer-executable to implement applying a first voltage and the applying a second voltage further comprise program instructions computer-executable to implement driving the inertial actuator attached to the moveable lens carriage body with an asymmetric oscillatory electrical signal having a sawtooth waveform.

* * * * *